ELECTRICALLY OPERATED MERCHANDISE VENDING MACHINE

Filed Jan. 21, 1963 13 Sheets-Sheet 1

INVENTORS
WILLIAM C. PHILLIPS
RODERICK W. PHILLIPS
WILLIAM H. CALLAHAN
by: [signature]
ATTY.

ELECTRICALLY OPERATED MERCHANDISE VENDING MACHINE

INVENTOR.
WILLIAM C. PHILLIPS
RODERICK W. PHILLIPS
WILLIAM H. CALLAHAN by: [signature] ATTY.

ELECTRICALLY OPERATED MERCHANDISE VENDING MACHINE

INVENTORS
WILLIAM C. PHILLIPS
RODERICK W. PHILLIPS
WILLIAM H. CALLAHAN
by: [signature] ATTY.

ELECTRICALLY OPERATED MERCHANDISE VENDING MACHINE

INVENTORS
WILLIAM C. PHILLIPS
RODERICK W. PHILLIPS
WILLIAM H. CALLAHAN
by: [signature] ATTY.

INVENTORS
WILLIAM C. PHILLIPS
RODERICK W. PHILLIPS
WILLIAM H. CALLAHAN
by: [signature]
ATTY.

ELECTRICALLY OPERATED MERCHANDISE VENDING MACHINE

Filed Jan. 21, 1963 13 Sheets-Sheet 6

INVENTORS
WILLIAM C. PHILLIPS
RODERICK W. PHILLIPS
WILLIAM H. CALLAHAN
by: [signature]
ATTY.

ELECTRICALLY OPERATED MERCHANDISE VENDING MACHINE

Filed Jan. 21, 1963 13 Sheets-Sheet 7

INVENTORS
WILLIAM C. PHILLIPS
RODERICK W. PHILLIPS
WILLIAM H. CALLAHAN
by: [signature]
ATTY.

ELECTRICALLY OPERATED MERCHANDISE VENDING MACHINE

INVENTORS
WILLIAM C. PHILLIPS
RODERICK W. PHILLIPS
WILLIAM H. CALLAHAN
by: [signature]
ATTY.

INVENTORS
WILLIAM C. PHILLIPS
RODERICK W. PHILLIPS
WILLIAM. H. CALLAHAN
by: [signature] ATTY.

INVENTORS
WILLIAM C. PHILLIPS
RODERICK W. PHILLIPS
WILLIAM H. CALLAHAN
by: [signature]
ATTY.

ELECTRICALLY OPERATED MERCHANDISE VENDING MACHINE

Filed Jan. 21, 1963 13 Sheets-Sheet 11

INVENTORS
WILLIAM C. PHILLIPS
RODERICK W. PHILLIPS
WILLIAM H. CALLAHAN
by: [signature]
ATTY.

INVENTORS
WILLIAM C. PHILLIPS
RODERICK W. PHILLIPS
WILLIAM H. CALLAHAN
by: [signature] ATTY.

ELECTRICALLY OPERATED MERCHANDISE VENDING MACHINE

INVENTORS
WILLIAM C. PHILLIPS
RODERICK W. PHILLIPS
WILLIAM H. CALLAHAN
by: [signature] ATTY.

United States Patent Office 3,164,294
Patented Jan. 5, 1965

3,164,294
ELECTRICALLY OPERATED MERCHANDISE VENDING MACHINE

William C. Phillips, Roderick W. Phillips, and William H. Callahan, Aurora, Ill., assignors to Lektro-Vend Corp., Aurora, Ill., a corporation of Delaware
Filed Jan. 21, 1963, Ser. No. 252,630
19 Claims. (Cl. 221—84)

This invention relates to vending machines in general, and in particular to a vending machine capable of vending various types of products.

In the vending industry, the most significant cost aspect of vending machines is maintenance. Maintenance not only includes necessary repairs and replacements for the vending machine itself, but also the loading of the machine with the products to be dispensed. The greater the capacity of the machine as far as the number of units that it can hold, then normally the less often that the machine would have to be serviced. Also, the greater the variety of products that can be displayed and dispensed from a vending machine, the more sales that can be expected from the machine. Also, if the vending machine is constructed in accordance with an understanding of human nature, less repairs are likely to be needed.

With the above in mind, the general object of the invention has been to provide a vending machine that will increase the sales therefrom and which at the same time, will reduce the required maintenance thereof.

A more specific object of the invention is to provide a vending machine that more fully utilizes the space therein for the storage of salable products, and has consequently a greater capacity than prior art machines of the same size.

Another specific object of the invention is to provide a vending machine having a selector mechanism that is adapted to withstand abuse when, for example, a trespasser attempts to activate the selector mechanism without inserting any money.

Another specific object of this invention is to provide a vending machine having a selector mechanism that is arranged so that only one push button can be activated at a time to prevent possible cheating and abuse of the machine.

It is another specific object of this invention to provide a vending machine that is readily loaded by the serviceman so as to operate on the first-in first-out principle, that is, the products first loaded into the machine will be the products first dispensed.

Another specific object of this invention is to provide a vending machine that is provided with a product storing and dispensing unit that is rotatable and capable of being loaded from more than one side.

It is another specific object of this invention to provide a vending machine having a storage and dispensing unit composed of a plurality of individually rotatable storage and dispensing units that are individually and selectively activated and rotated by a common drive means.

Another specific object of this invention is to provide a vending machine that is arranged so that the product that the purchaser sees is the product that the purchaser receives, therefore, enabling the vending machine to be loaded with a large variety of products.

Another specific object of this invention is to provide an electromechanical mechanism that readily adapts the vending machine for use in dispensing comparatively small items such as mint and gum and other items of comparable size.

Another specific object of the invention is to provide an electromechanical mechanism that is readily usable in vending machines and is adapted to dispense mint and gum and other items of comparable size, and which dispenses the mint and gum into a delivery slot by pushing the mint or gum from its storage position.

Another specific object of this invention is to provide a vending machine having a retractable cabinet support means associated therewith to guard against any tipping of the vending machine cabinet when the vending machine is being serviced.

Another specific object of the invention is to provide a vending machine with storage and dispensing units that can accommodate articles of merchandise of various sizes.

Another specific object of the invention is to provide a vending machine having a delivery door interlock that prevents selection of an article of merchandise if the delivery door is not closed.

Another specific object of the invention is to provide a vending machine that has movable means provided therein that inhibit a pilferer from reaching through the delivery door into the machine to remove articles of merchandise from their storage area.

Briefly, in a preferred embodiment of the invention, a vending machine is provided having a cabinet for supporting the various mechanisms contained therein. Products such as, for example, candy, pastry, gum and mint, can all be dispensed from the vending machine and the vending machine is provided with distinct types of storage and dispensing units. One type is utilized for storage and dispensing of candy and pastry products or any products of a comparable size, and the second type is utilized for storage and dispensing of gum and mint or any product of a comparable size. The first type of storage and dispensing unit has a number of columns provided therein that are selectively and independently rotatable and which are constructed in an endless chain-type of arrangement. The first type of storage and dispensing unit is pivotally positioned in the cabinet and can be swung down when the cabinet is opened, so that the front and back of the first type storage and dispensing unit can be loaded by the serviceman. A flexible plastic curtain is provided with the first type storage and dispensing unit which travels in a track around the outside of the endless chain-type construction and is movable from the back to the front, to prevent the stored products from falling out when the storage and dispensing unit is pivoted downwardly, to enable the rear side thereof to be loaded with the dispensable products. Each storage column is selectively advanced one step each time a selector is activated corresponding to the rotatable column. The second type of storage and dispensing units is utilized to dispense gum and mint and the gum or mint is stacked one on top of the other in separate columns and the columns themselves can be separated and stacked one on top of the other. An electromechanical mechanism is positioned adjacent the bottom of each column, and when activated and cycled pushes the bottom item which is gum, mint or the like, into a common delivery tray and then shuts itself off. A selector mechanism is provided to activate the first type storage and dispensing unit and an almost identical selector mechanism is provided to activate the second type of storage and dispensing unit. Each selector mechanism is provided with a mechanical interlock that enables only one push button corresponding to a column in its storage and dispensing unit to be activated at a time. An electrical interlock prevents both selectors from being activated at the same time (the first to be energized de-activates the other). The selector mechanism is supplied with push buttons provided with a clutch mechanism that enables other than the activated push button to be manipulated without having any effect on the selecting process. The selector mechanism associated with the first type of storage and dispensing unit is provided with means that are activated by a provided delivery door interlock to prevent any selection of an article of merchandise when the delivery door is not closed. A plurality of transparent windows are provided in the cabinet adjacent the first storage and dispensing units and are so situated that the purchaser can see the products that will be next delivered to the delivery tray when the vending machine is activated. Inasmuch as the first storage and dispensing units are pivoted forward in the cabinet and even though counterbalanced when loaded there is a possibility of the cabinet tipping over, although the cabinet should not tip over, if properly installed. However, a vending machine support assembly is provided in the cabinet so that when the cabinet door is opened, the vending machine support assembly swings out and engages the floor to prevent the cabinet from tipping forward. Further the vending machine is provided with a delivery door interlock assembly which inhibits a pilferer from reaching into the vending machine and dislodging any of the stored articles.

Other objects, features and advantages of the invention will become more apparent if the following description is viewed in light of the accompanying drawings of which:

Figure 1:
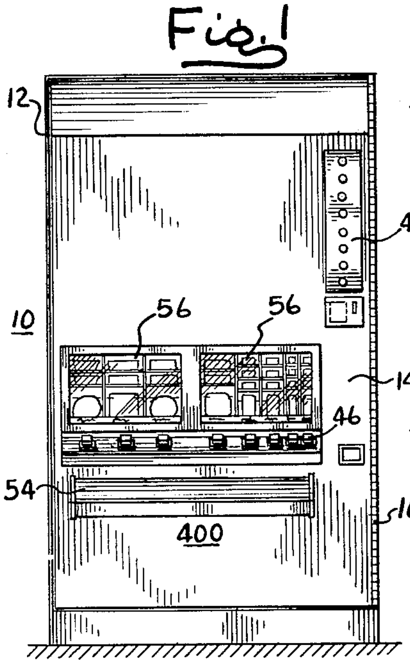
FIG. 1 is a front-elevational view of a vending machine embodying the features of the invention.

Referring now to the drawings and especially FIGS. 1 through 4, 8 and 9, there is illustrated a vending machine 10 comprising a rectangularly shaped cabinet 12 provided with a front door 14 hinged at 16 to the cabinet 12. Inside the cabinet 12, there is positioned two candy-pastry units 20 and 22 that are pivotal mounted and normally maintained in an upright position in the cabinet 12. The candy-pastry units 20 and 22 have mounting pins 24 securely attached to each side. The mounting pins 24 and consequently the candy-pastry units 20 and 22 are slidably positioned in substantially vertical slots (not shown) formed in candy-pastry support brackets 26 that are in turn securely fastened to the rectangular cabinet 12.

Figure 2:
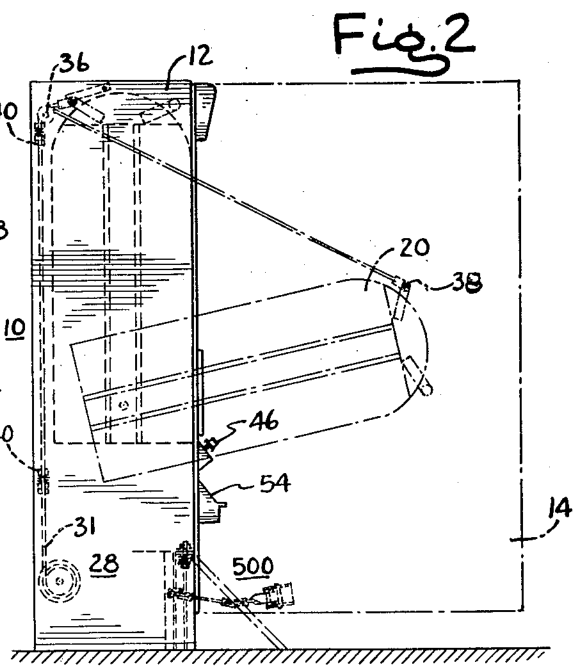
FIG. 2 is a side-elevational view of the vending machine illustrated in FIG. 1 with a candy-pastry unit ghosted in dotted lines in a loading position.
Figure 3:
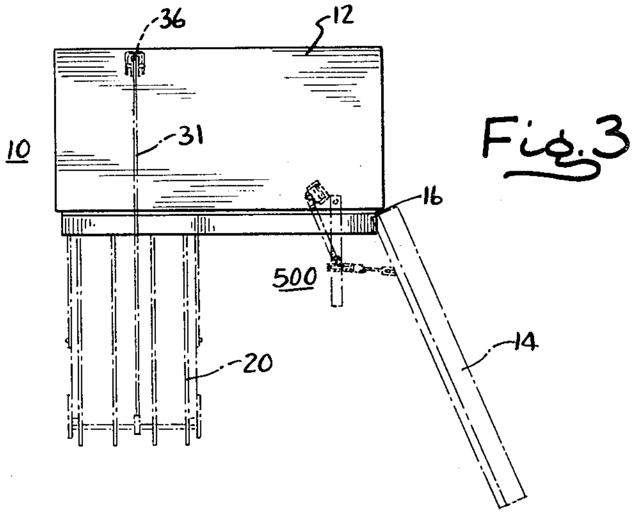
FIG. 3 is a plan view of the vending machine illustrated in FIG. 1 with a candy-pastry unit ghosted in dotted lines in a loading position.

The candy-pastry units 20 and 22 are therefore pivotal mounted within the cabinet 12 and can be swung out for loading as illustrated in FIGS. 2 and 3 and as will be described. The pivotal movement of the candy-pastry units 20 and 22 is limited by the candy-pastry unit pivotal limiting means 28 illustrated in FIGS. 2, 3, 4, 8 and 9 and which comprises a torsion spring 30 wound around and attached at one end to a torsion spring spool 32 with the free or movable end of the torsion spring 30, wound around and securely attached to a first pulley 34 for movement therewith, tensioning cable 31 wound around a groove in pulley 34 and then extending up to and around a second pulley 36 and finally being attached at its upper end to latching bar 38. The latching bar 38 is attached to the candy-pastry unit and extends thereacross. The spring spool 32 is conveniently attached to the vending machine cabinet 12 by brackets which are in turn welded or otherwise attached to the vending machine cabinet 12. A stop member 40 is securely attached to the cable 31 which is attached to the torsion spring 30 to limit the pivotal movement of the candy-pastry units 20 and 22. The stop member 40 attached to cable 31 jams into the second pulley 36 housing when the candy-pastry units 20 and 22 have been pivoted forward to a predetermined position and prevent any further pivotal travel of the candy-pastry units 20 and 22.

Figures 4, 5, 6, 7:
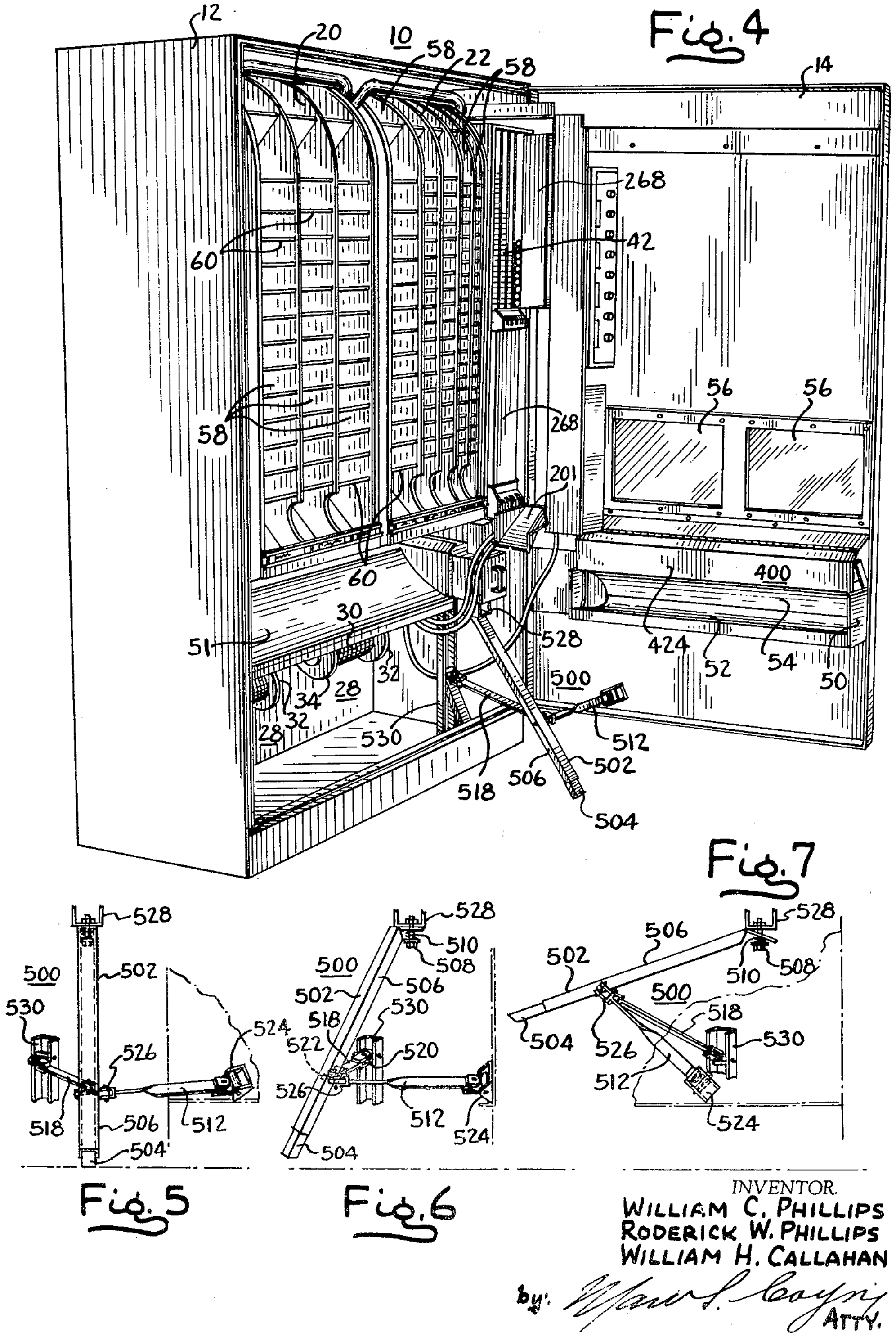
FIG. 4 is an enlarged perspective view of the vending machine illustrated in FIG. 1 with the door swung open.
FIGS. 5, 6 and 7 are fragmentary views illustrating a vending machine support assembly utilized in the vending machine illustrated in FIG. 1.
Figure 8:
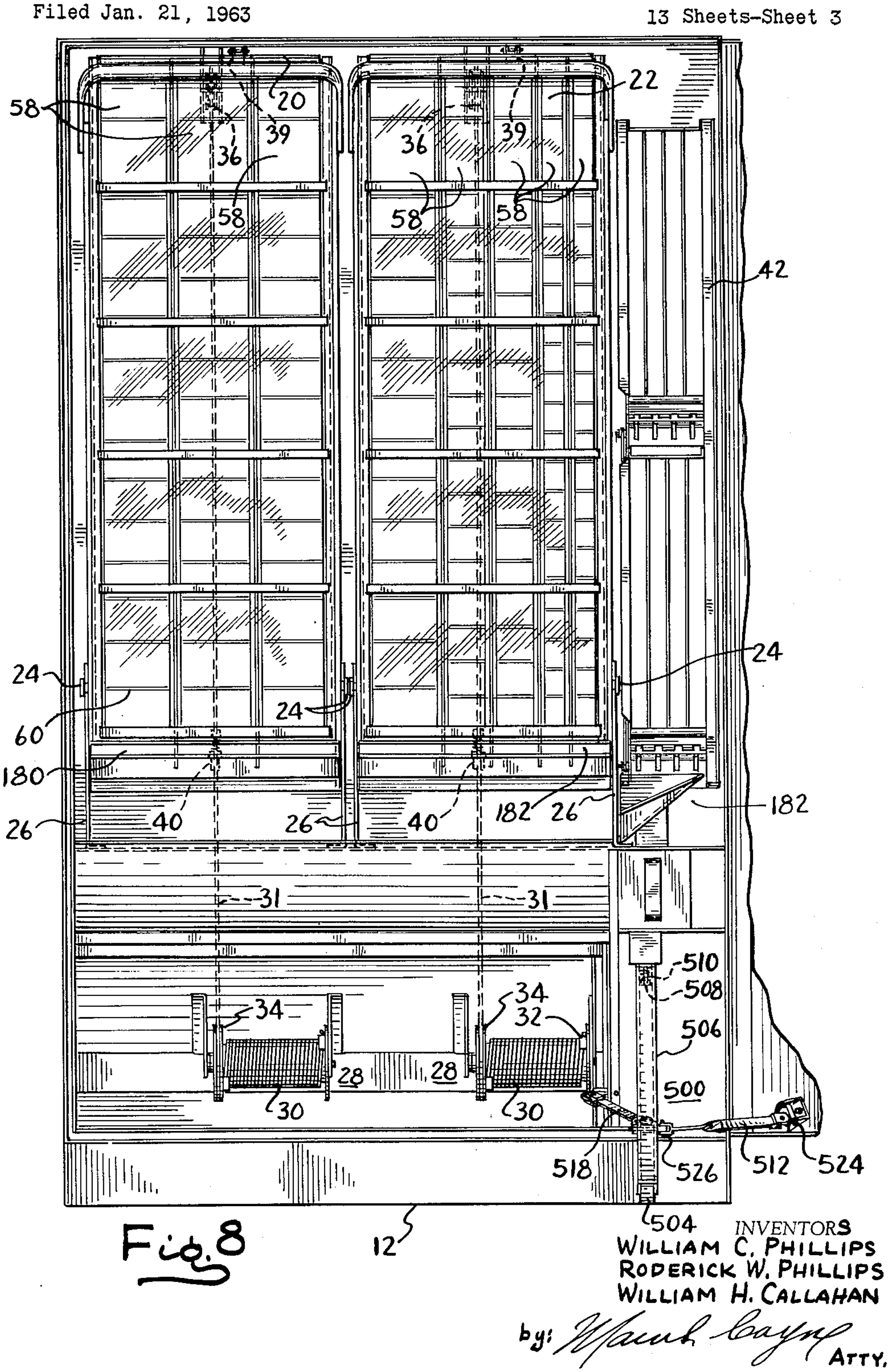
FIG. 8 is an enlarged front-elevational view of the vending machine illustrated in FIG. 1 with the door cut away.

Slidably positioned in the cabinet 12 as best illustrated in FIGS. 4 and 8 is a stacked mint-gum unit 42. The mint-gum unit 42 is capable of sliding backward and forward in the cabinet 12 although the means for providing the slidability is not shown inasmuch as it is not considered as forming part of the invention.

Figures 9, 10:
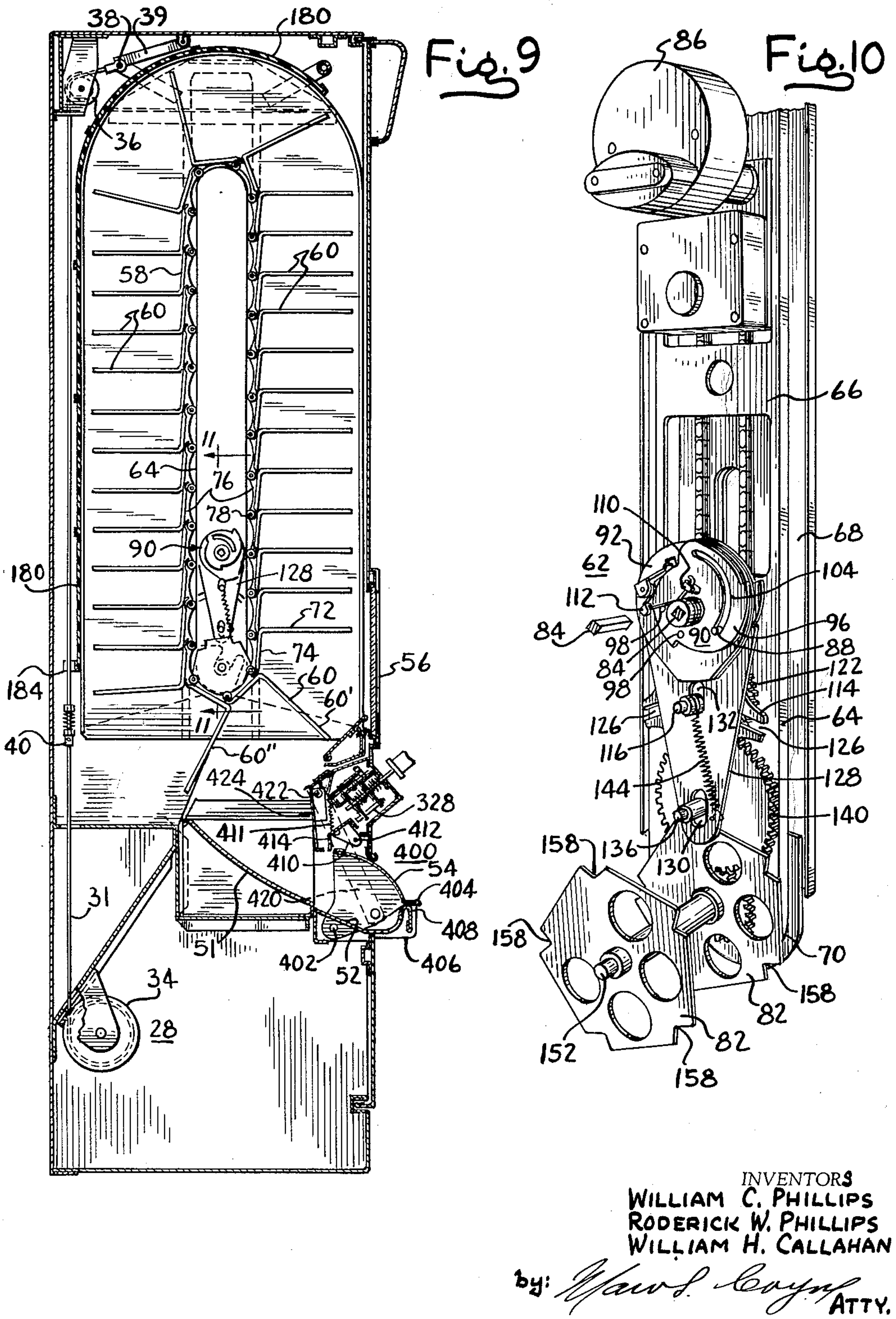
FIG. 9 is an enlarged cross-sectional side view of the vending machine illustrated in FIG. 1.
FIG. 10 is a perspective view of a portion of the selective drive mechanism utilized in the vending machine illustrated in FIG. 1.
Figure 11:
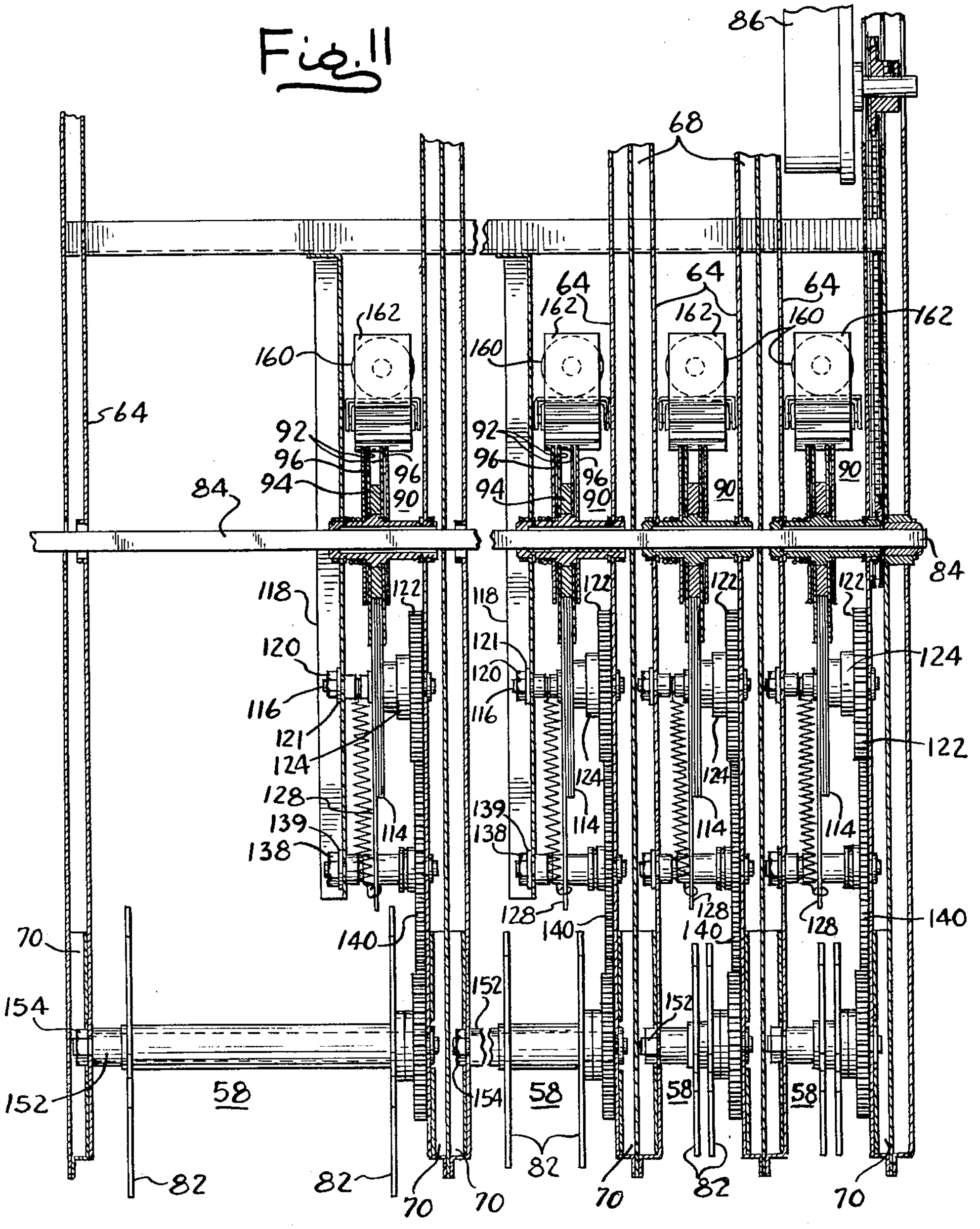
FIG. 11 is a view taken along the line 11—11 in FIG. 9 with certain parts omitted for clarity of description.

Also positioned within the cabinet 12 is a vending machine support and door stop assembly 500. The vending machine support and door stop assembly 500 when the front door 14 is opened swings from an upward position outwardly and downwardly and when the front door 14 is completely open rests against the floor so as to prevent the rectangular cabinet 12 from tipping forward, as will be described more clearly. Positioned on the front door 14 is the candy-pastry selector mechanism 46 and projecting through an opening in the front door 14 when the door is closed is the mint-gum selector mechanism 48 which is fastened to the mint-gum unit and coin plate support. These mechanisms 46 and 48 activate the vending machine to begin its cycle to dispense the desired goods to the purchaser as will be seen more clearly. Also positioned on the door 14 is the delivery door interlock assembly 400. The delivery door interlock assembly 400 fits up against and is in operable contact with the delivery door 54 positioned on the front door 14 as best shown in FIG. 9. The delivery door interlock assembly 400 is so arranged that no selection can be made of any goods from the candy-pastry units if the delivery door 54 is not in a closed position and also the delivery door interlock assembly 400 is so constructed that one cannot open the delivery door when a selector knob of the candy-pastry selector 46 is in a depressed position as will be shown.

Also positioned on the front door 14 is a pair of transparent windows 56 which can be composed of glass or a suitable plastic and which enable the items positioned in the candy-pastry units 20 and 22 to be visible to the purchaser before the purchaser makes his or her selection.

The vending machine is equipped with an electrical circuit (not shown) for programming the vending machine through its operations and also is provided with a coin accumulator that recognizes and marks the coin intake and which redelivers the money to the purchaser in the event that the purchaser changes his mind before selection or for any other reason. However, these parts of the vending machine are not considered to be a portion of the patentable invention and are therefore not described in detail.

Each separate portion of the vending machine will be described in detail before their interrelation will be presented for the purpose of better understanding.

THE CANDY-PASTRY UNITS 20 AND 22

The candy-pastry units 20 and 22 including individual parts thereof are illustrated in FIGS. 1 through 4, 8 through 20 and 31 through 33. The candy-pastry units 20 and 22 are pivotably positioned in the rectangular cabinet 12 of the vending machine 10 and readily pivot outwardly as illustrated in FIGS. 2 and 3. Each candy-pastry unit 20 and 22 is composed of a plurality of endless chain-type shelf mechanisms 58. The width of the endless chain-type shelf mechanisms 58 can vary to be adaptable to receive articles of merchandise of various sizes. As shown in drawings and especially FIG. 8, the candy-pastry unit 20 is composed of three endless chain-type shelf mechanisms 58 of equal width. The candy-pastry unit 22 is composed of five endless chain-type shelf mechanisms 58 of various widths. In order to provide standardized candy-pastry units the overall width of the candy-pastry unit 20 and candy-pastry unit 22 is preferably the same for purposes of interchangeability and assembly. Each endless chain-type shelf mechanism 58 is independently movable. Each time the vending machine 10 is energized, one of the endless chain-type shelf mechanisms 58 will move one dispensing position to dispense candy or pastry or some other article of merchandise to the outer delivery tray 52 and thence to the purchaser.

Each endless chain-type shelf mechanism 58 is comprised of a plurality of L-shaped shelves 60 (FIGS. 4, 8, 9 and 31 through 33) connected one to the other in an endless chain type arrangement. Each endless chain-type of shelf mechanism 58 is provided with a selector drive mechanism 62 (FIGS. 10 through 20) which in response to the energizing of the machine and the selection of a particular article of merchandise, engages one specific endless chain-type shelf mechanism 58 and moves that shelf mechanism 58 one dispensing position. Each endless chain-type shelf mechanism 58 is comprised of a pair of spaced rail forming elements 64 spaced apart a distance that is directly related to the width of the particular L-shaped shelf 60 being supported by the pair of spaced rail forming elements 64 (see FIG. 32). Each rail forming element 64 is composed of a flat base member 66 rounded at the top and having the top capable of being telescoped so as to be adjustable to take up any slack due to allowable tolerances in the L-shaped shelves 60. Each rail forming element 64 has various holes punched therein through which common drive shafts and common supporting bars and the actuating relays can be positioned as will become more clear.

Figures 12, 13:
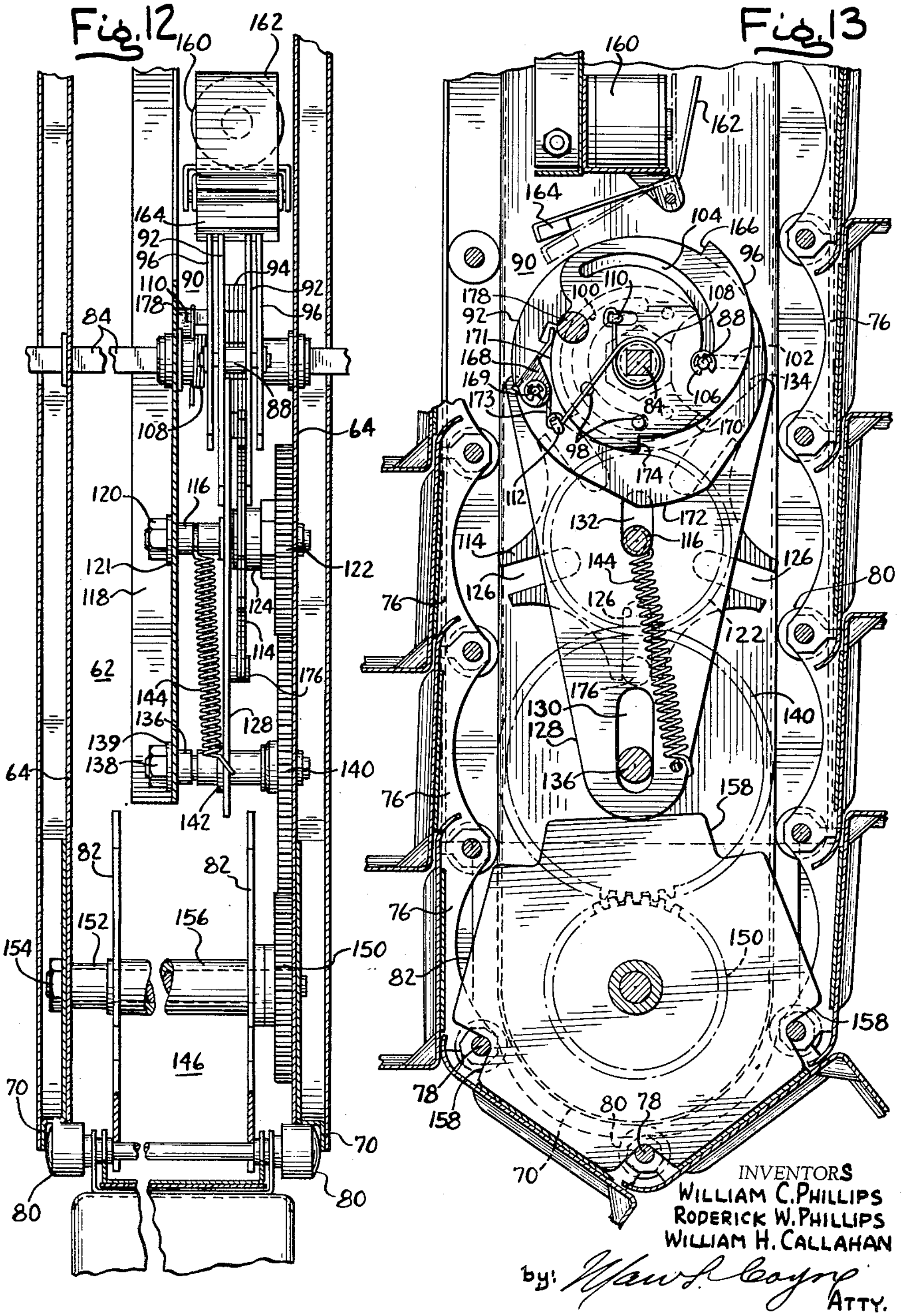
FIG. 12 is a front view of a portion of selective drive mechanism utilized in the vending machine illustrated in FIG. 1.
FIG. 13 is a side view of the selective drive mechanism utilized in the vending machine illustrated in FIG. 1.

The bottom of the illustrated rail forming element 64 is rounded as shown (FIGS. 9, 12, 13 and 31) and may be symmetrical about the vertical axis as viewed, for example, from FIG. 13. If the bottom of every rail forming element 64 is rounded as shown and if the L-shaped shelves 60 associated therewith are of different heights or unequally spaced, the radial travel of each L-shaped shelf 60 as it moves around the bottom of its associated rail forming elements 64 will vary depending upon its height. Therefore, to provide for uniform radial movement during the time of dispensing an article of merchandise from the L-shaped shelves 60 the radius of curvature of the bottom of the rail forming elements 64 will have to be adjusted according to the relative height of the associated L-shaped shelves. This might affect the symmetry of the bottom of the rail forming elements 64. However, it is obviously desirable to have each L-shaped shelf 60 rotate the same number of degrees as it moves around its associated rail forming elements 64 regardless of the relative heights of the various L-shaped shelves 60. This necessitates that the radius of curvature of the bottoms of the rail forming elements 64 vary with the height of their associated L-shaped shelves 60.

Integrally formed with the flat base member 66 are a pair of U-shaped guide rails 68 into which roll a plurality of shelf rollers 80 attached to the L-shaped shelves 60 as will be explained. The U-shaped guide rails 68 are integrally formed with the flat base member 66 and extend vertically as viewed in FIG. 10 but do not extend and go around the top and bottom curved ends of the flat base member 66. Integrally formed around the ends of the flat base member 66 are L-shaped guide rails 70. The upper L-shaped guide rails are adjustable to properly tension the endless chain of shelves 60. Positioned between the pair of spaced rail forming elements 64 is the selective drive mechanism 62. The pair of rail forming elements 64 are shown spaced apart the required distance by mounting shaft 152 and the common drive shaft 84 but other means can be utilized as can be readily imagined.

An endless chain of L-shaped shelves 60 are formed and positioned in the U-shaped guide rails 68 and the L-shaped guide rails 70 of the pair of spaced rail-forming elements 64. Each L-shaped shelf 60 has a horizontal leg 72 and a vertical leg 74. The width of the horizontal leg 72 determines the width of the particular individual shelf and the height of the vertical leg 74 determines the spacing between shelves or the height of the next adjacent shelf and preferably the L-shaped shelves 60 of each endless belt-type shelf mechanism 58 are all of the same dimensions. Attached to the outside face of the vertical leg 74 of each L-shaped shelf 60 is a pair of substantially arcuate fastening brackets 76. The fastening brackets 76 are so shaped that the ends closest to the horizontal leg 72 are spaced further apart than the ends furthest away from the horizontal leg 72 (see FIG. 33). This is done so that the L-shaped shelves 60 can be fastened one to the other by means of shelf-connecting shafts 78 that extend through apertures formed in the ends of the fastening brackets 76. The shelf-connecting shafts 78 may be arranged to retain the fastening brackets 76 by any means. Positioned at the outer ends of each shelf connecting shaft 78 are the pair of rotatable shelf rollers 80 which can be rotatably secured to shaft 78 by any means.

Each selector drive mechanism 62 of each endless chain-type shelf mechanism 58 is positioned between the pair of spaced rail forming elements 64 and is provided with a pair of drive sprockets 82 that engage the shelf-connecting shafts 78 as the L-shaped shelves 60 move around the bottom of the endless chain-type shelf mechanism 58. A common drive shaft 84 is provided that extends through each endless chain-type shelf mechanism 58 and the common drive shaft 84 can be driven by a drive motor 86 (FIGS. 10 and 11) through a sprocket and chain arrangement not completely shown. Positioned on the common driveshaft 84 is a drive pin moving mechanism 90 (FIGS. 9 through 20). The drive pin moving mechanism 90 comprises a pair of fixed and spaced plates 92 rigidly connected to the common drive shaft 84 and spaced from each other by a plurality of spacers 94, also affixed to the common driveshaft 84. Positioned exteriorly of the fixed and spaced plates 92 are a pair of movable plates 96. The movable plates 96 can rotate with respect to the fixed and spaced plates 92 and are held together by a pair of fastening rivets 98, that extend through a pair of arcuate slots 100 formed in the fixed and spaced plates 92. The movable plates 96 are also connected by a drive pin 88 that extends through radial slots 102 formed in the fixed and spaced plates 92 and an arcuate slot 104 formed in the movable plates 96. The drive pin 88 and roller has a pair of retaining rings 106 affixed to each end so as to maintain the drive pin 88 in its fixed position. The movable plates 96 are spring biased by spring 108 to the position illustrated in FIG. 13 where further movement of the movable plates 96 in a counterclockwise direction is prohibited by the drive pin 88. One end of the spring element 108 is connected to the movable plate 96 at post 110 and the other end of the spring element 108 is connected to the fixed and spaced plate 92 at the post 112. Arcuate slot 104 formed in the movable plates 96 is shaped so that when the fixed and spaced plates 92 are rotating relative to the movable plates 96 the drive pin 88 moves radially outward in the radial slot 102.

Also positioned in the selector drive mechanism 62 is a star-shaped gear member 114. The star-shaped gear member 114 is rotatably mounted on a mounting shaft 116, that is in turn secured to a frame member 118 by means of a nut and washer 120 and 121 and to one of the pair of spaced rail forming elements 64 by means of hammering over the end of the shaft 116 or welding or by any means known to those skilled in the art. Also rotatably mounted on the mounting shaft 116 for movement in unison with the star-shaped gear 114 is first drive gear 122. The star-shaped gear member 114 and the first drive gear 122 are separated by a spacer element 124 secured to the mounting shaft 116. When the drive pin 88 is positioned at the outer radial end in slot 102 it moves into one of the star slots 126 positioned in the star shaped gear member 114. Also positioned in the selector drive mechanism 62 is a sector-shaped locking member 128. The sector-shaped locking member 128 has two elongated slots 130 and 132 formed therein. The sector-shaped locking member 128 has an arcuate drive surface 134 formed at one end and the arcuate drive surface 134 is engaged by the drive pin 88 when the drive pin 88 is at its outward radial position in the slot 102 and when in that position, moves the sector-shaped locking member 128 down, as viewed in FIG. 13. The sector-shaped locking member 128 is positioned so that its elongated slot 132 has the mounting shaft 116 positioned therein and the elongated slot 130 has a mounting shaft 136 positioned therein.

The mounting shaft 136 is secured to the frame member 118 by a nut and washer arrangement 138 and 139 respectively. The opposite end of the mounting shaft 136 is connected to one of the pair of spaced rail forming elements 64 by any means such as its end being knocked over or welded to member 64.

Rotatably secured to one end of the mounting shaft 136 is a second drive gear 140. The second drive gear 140 is always in mesh with the first drive gear 122 and rotates whenever the first drive gear 122 is rotated. One end of the sector-shaped arcuate member 128 is held in position on mounting shaft 136 by retaining ring 142 and the other end of the sector-shaped locking member 128 is positioned between the fixed and spaced plates 92 and is positioned above the star-shaped gear member 114 between plates 92. The sector-shaped locking member 128 is spring-biased so as to be normally held up against the spacers 94 which separate the fixed and spaced plates 92, as can be seen in the drawings. The sector-shaped locking member 128 is spring-biased by biasing spring 144. Biasing spring 144 is attached to the sector-shaped locking member 128 at one end thereof as shown in the drawings (FIGS. 12 and 13) and to the mounting shaft 116 also as clearly illustrated in the drawings (FIGS. 12 and 13).

The selector-drive mechanism 62 also includes sprocket assembly 146. The sprocket assembly 146 comprises a pair of drive sprockets 82, a third drive gear 150, and a mounting shaft 152. The third drive gear 150 is in continuous mesh with the second drive gear 140 and rotates whenever the second drive gear 140 rotates. The third drive gear 150 is rotatably mounted on the mounting shaft 152 and the mounting shaft 152 is secured to one of the pair of spaced rail forming elements 64 by means of a nut 154 and to the other of the pair of spaced rail forming elements 64 by any means such as having its other end hammered over or by welding or whatever is appropriate. The driving sprockets 82 are spaced apart a predetermined distance related to the width of the associated L-shaped shelves 60 and are mounted on a rotatable shaft 156 that is secured to the third drive gear 150 so that when the third drive gear 150 rotates the driving sprockets 82 also rotate. The driving sprockets 82 have a plurality of notches 158 cut therein and the notches 158 are adapted to engage the shelf-connecting shafts 78 to thereby drive the endless chain-type shelf mechanism 58 sequentially from one dispensing position to another.

The selective drive mechanisms 62 of each endless chain-type shelf mechanism 58 are all connected to a common drive shaft 84 (FIG. 11) and all of the drive pin moving mechanisms 90 of each endless chain-type shelf mechanism 58 rotate in unison with the common drive shaft 84. Therefore, there must be some means provided for activating one of the endless chain-type shelf mechanisms 58 and not activating any other of the endless chain-type shelf mechanisms 58. This is done by the provision of selector relays 160. When the purchaser selects a particular item, the purchaser feeds this information into the vending machine by activating actuators, which will be explained, and a selector relay 160 corresponding to that selection is energized. When the selector relay 160 is energized, it pulls in its armature 162 towards itself as illustrated in FIG. 13 in dotted lines. The energizing of the relay 160 and the pulling in of the armature 162 pivots actuator arm 164 connected to the armature 162. If desired the actuator arm 164 can be pivotally connected to armature 162 and biased for movement in unison by a spring. This prevents chattering of the armature 162 when the actuator arm 164 is moved out of the way by the spaced and fixed plates 92 as will be seen.

Figure 14:
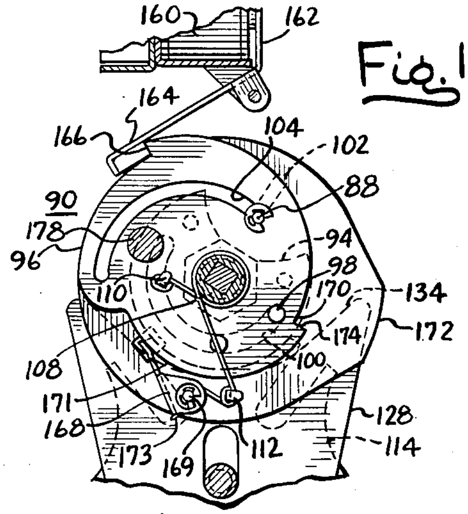
FIGS. 14 through 20 are partial side views of the selective drive mechanism illustrated in FIG. 10 showing the relative positioning of the various parts of the selective drive mechanism during successive positions of the selective drive mechanism.

Operation of selector relay 160 moves the actuator arm 164 into the path of the drive pin moving mechanism 90. Each of the movable plates 96 has a latching edge 166 formed thereon and the latching edge 166 as it rotates in unison with the common drive shaft 84 and the fixed and spaced plates 92, engages the actuator arm 164 of selector relay 160 and is retained by the actuator arm 164 from further movement, as shown in FIG. 14. FIG. 14 represents the condition when the latching edge 166 is first engaged by the actuator arm 164 and it should be noticed that the drive pin 88 is in its inward position in the radial slot 102 and positioned in the right-hand or trailing end of the arcuate slot 104 as viewed in FIG. 14.

It should be noticed that the arcuate slot 104 extends outwardly in radial fashion as the slot moves from right to left as viewed in FIG. 14, and because of this configuration, the drive pin 88 is moved from its inward position in the radial slot 102 as shown in FIG. 14 to its outward position in radial slot 102 as shown in FIGS. 16 through 19.

Figure 15:
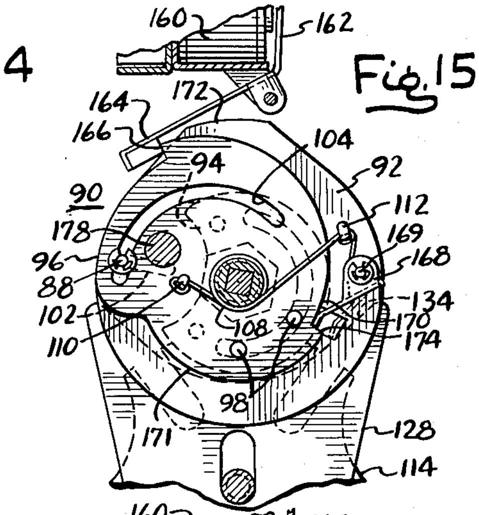
Figure 16:
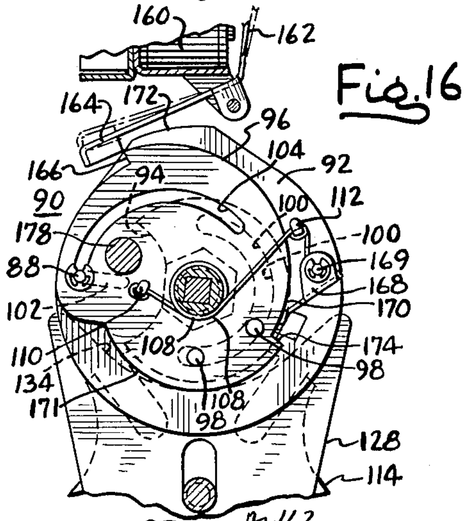

After the latching edges 166 have been engaged by the actuator arm 164, the movable plates 96 do not rotate with the fixed and spaced plates 92 as the drive pin mechanism 90 continues rotation under the drive of the common drive shaft 84. The movable plates 96 remain stationary and in contact with the actuator arm 164 as the drive pin moving mechanism 90 continues its rotation. A movable plate spring-biased latching element 168 rotatably positioned on spring post 169 attached to the upper of the fixed and spaced plates 92 is spring biased by a wound spring 173 into contact with the cam surface 171 of the upper one of the movable plates 96, as viewed in FIG. 14. The spring biased latching element 168 rides on cam surface 171 until the latching surface 170 moves underneath the movable plate spring-biased latching element 168 as shown in FIG. 15. The movable plate spring-biased latching element 168 thereafter rotates and is biased against the latching surface 170 of the upper of the movable plates 96 as shown in solid in FIG. 15. The fixed and spaced plates 92 of the drive pin moving mechanism 90 continue rotation with respect to the movable plates 96 until the actuator arm camming surfaces 172 formed on the fixed and spaced plates 92 engage the actuator arm 164 and move the actuator arm 164 out of the way so as to enable the latching edges 166 of the movable plates 96 to move underneath the actuator arm 164 so as to thereafter move in unison with the fixed and spaced plates 92, as will be explained. This particular situation is best illustrated in FIG. 16 and as can be seen in FIG. 16 the drive pin 88 is at its outermost point in the radial slot 102 and completely over to the left in the arcuate slot 104. The drive pin 88 is now in its driving position. As soon as the movable plates 96 have cleared the actuator arm 164, the spring element 108, which biases the movable plates 96 toward the counter-clockwise position as viewed in FIGS. 14 to 20, tends to rotate the movable plates 96 back to their original position and relative to fixed and spaced plates 92. However, the movable plate spring-biased latching element 168 moves against the notch surface 174 in the upper movable plate 96 and thereby prevents the rotation of the movable plate 96 under the force of the spring element 108. Thereafter, the movable plates 96 rotate in unison with the fixed and spaced plates 92 and do so until the movable plate spring-biased latching element 168 is disengaged from the notch surface 174.

Figure 18:
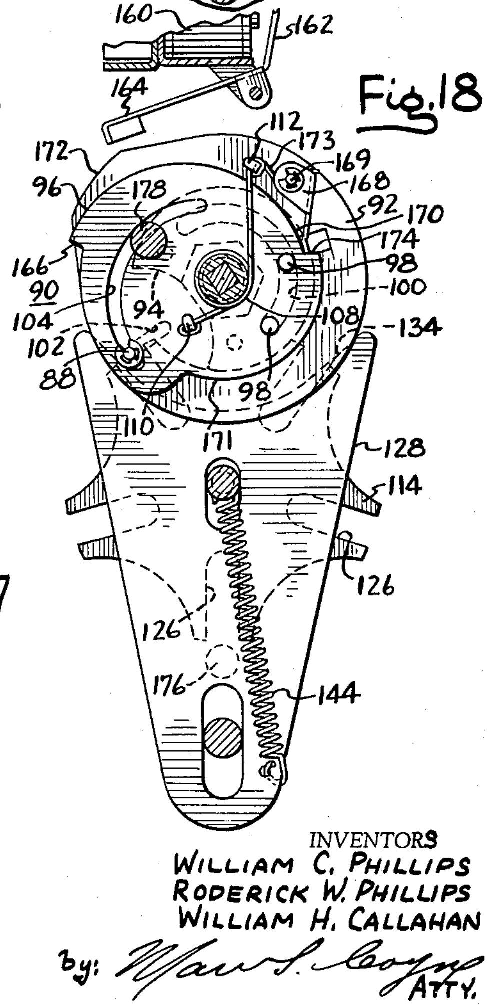
Figure 17:
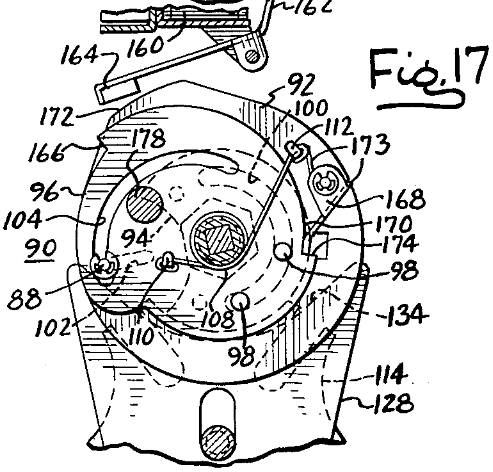

Initially, the sector-shaped locking member 128 is positioned up against the spacers 94 by biasing spring 144 as shown in FIG. 13 and specifically the arcuate drive surface 134 of the sector-shaped locking member 128 is positioned up against the spacers 94. As the drive pin moving mechanism 90 continues rotation (FIGS. 17 and 18), the drive pin 88 engages the arcuate drive surface 134 of the sector-shaped locking member 128 and pushes the sector-shaped locking member 128 away from the spacers 94 as best illustrated in FIG. 18 and consequently causes a pin element 176 securely positioned on the inner surface of the sector-shaped locking element 128 to be pushed out of the star slot 126 as is illustrated in dotted lines in FIG. 18. The purpose of the element 176 is to prevent the star-shaped gear member 114 from rotating due to the weight of the articles of merchandise supported on its associated endless chain-type shelf mechanism 58. This insures that the star-shaped gear member 114 will move only under the driving force of the drive pin 88.

Subsequently, the drive pin 88 moves into one of the appropriately positioned star slots 126 of the star-shaped gear member 114 (FIG. 18), and thereafter rotates the star-shaped gear member 114 a predetermined distance (FIG. 19), thus causing the first drive gear 122 to rotate to thereby cause the rotation of the second and third drive gears 140 and 150, respectively, and consequently the rotation of the driving sprockets 82 and therefore the movement of the L-shaped shelves 60 in the L-shaped and U-shaped rails 70 and 68 respectively of the endless chain-type shelf mechanism 58. The star-shaped gear member 114 and the L-shaped shelves 60 continue rotation as long as the drive pin 88 is positioned in an associated star slot 126, and after the drive pin 88 in its continual rotational movement moves out of the star slot 126 in the star shaped gear member 114 (FIG. 20), the star-shaped gear member 114 discontinues rotation causing a subsequent discontinuance of rotation of the first, second and third drive gears 122, 140 and 150, respectively, thus discontinuing the movement of the driving sprockets 82 and the L-shaped shelves 60. As the drive pin 88 moves upwardly along the arcuate drive surface 134 of the sector-shaped locking member 128 (FIG. 19), biasing spring 144 moves the sector-shaped locking member 128 back to its original position up against the spacers 94 of the drive pin moving mechanism 90, as can be seen in FIG. 20 again locking the star shaped gear member 114 with pin element 176 of the sector-shaped locking element 128.

Figures 19, 20, 25:
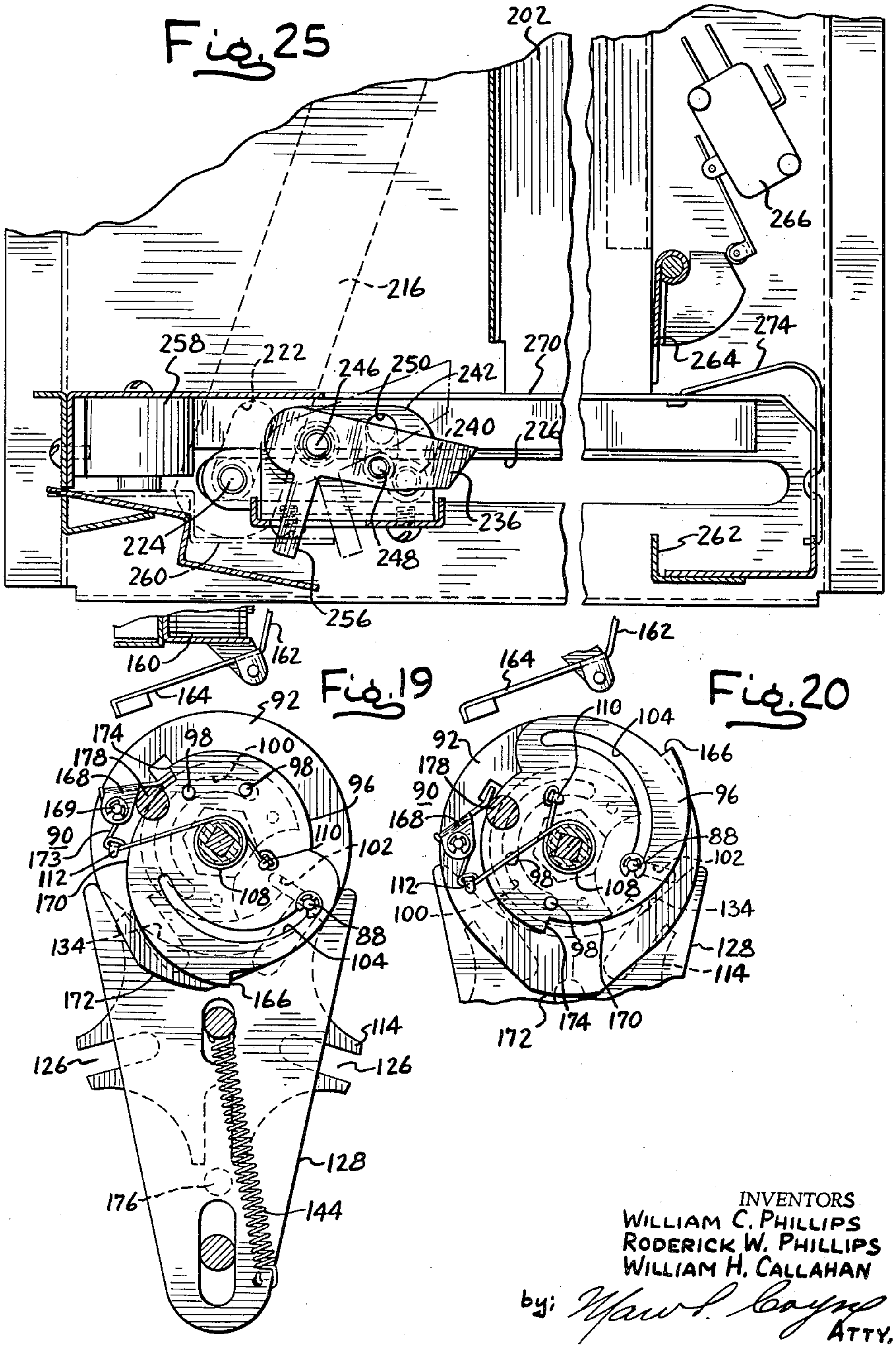
FIG. 25 is a fragmentary view of the mint-gum activator mechanism illustrating the side view of the mint-gum activator mechanism.

An unlatching pin element 178 is fixed to the frame member 118 (FIG. 13) and is so positioned so as to move the movable plate spring-biased latching element 168 outwardly from its position in engagement with the latching surface 172 and the notched surface 174 so as to enable the movable plates 96 to be rotated back to their original position by the spring element 108, as can be seen in FIG. 20. The unlatching pin element 178 engages the movable plate spring-biased latching element 168 as the movable plate spring-biased latching element 168 rotates underneath, and moves it outwardly and allows the movable plates to rotate back to their original position as stated.

In assembling a candy-pastry unit, it is desirable that they be of the same overall dimensions for standardization purposes. Each candy-pastry unit comprises a plurality of endless chain-type shelf mechanisms 56 which have been described in detail. The plurality of endless chain-type shelf mechanisms 58 have a common drive shaft 84 and are assembled together so as to be selectively operated. The exact and minute details of the means such as posts and bolts and nuts, etc., utilized to assemble the plurality of endless chain-type shelf mechanisms 58 together are not provided inasmuch as one skilled in the art can so provide.

THE MINT-GUM UNIT 42

The mint-gum unit 42 is illustrated in FIGS. 4, 8 and 21 through 25. The mint-gum unit 42 is movable inwardly and outwardly in the cabinet 12 for ease of loading and in the illustrated embodiment of the invention, eight different mint or gum articles can be dispensed from the vending machine. Four articles of merchandise can be dispensed from the lower portion of the mint-gum unit 42 and four articles of merchandise can be dispensed from the upper portion of the mint-gum unit 42 and the items of merchandise fall to a collector tray 201 (FIG. 4), inclined toward a delivery chute of tray 51 and are then delivered to the delivery chute or tray 52.

The mint-gum unit 42 is substantially rectangular in configuration and is provided with four upper merchandise storage sections 200 and four lower merchandise storage sections 202. In these storage sections 200 and 202, mint and gum, for example, can be stacked one upon the other. The merchandise is dispensed to collector tray 201 and then delivery tray 52 by the selected article of merchandise being pushed out of the front of the mint-gum unit 42 by the dispensing mint and gum mechanism 204, in a manner which will be explained. After an article has been dispensed from the mint and gum unit 42 all the articles of merchandise in the column from which the selected article was dispensed move down one position under the force of gravity.

The dispensing mechanism 204 comprises a drive motor 206 that is drivingly connected to a pair of cams 208 positioned on either side of the mint-gum unit 42 through a drive linking mechanism 210 that can be of any known type. Connected to each of the cams 208 on the outside of the mint-gum unit 42 are drive arms 212, 214 and 216. Drive arm 212 is pivotally connected to the cam 208 by any means known to those skilled in the art and drive arms 212, 214 and 216 are pivotally connected to one another at pivot point 218 and can be pivotally tied to one another by any known means. Therefore, the drive arms, 214, 216 and 218 can pivot with respect to one another. Also, drive arms 214 and 216 are pivoted at their outer ends to their respective mint and gum activator mechanisms 220. Drive arms 214 and 216 pivot at 219 and 221 respectively.

The mint and gum activator mechanism 220 illustrated in the upper part of the mint-gum unit 42 is identical to the mint-gum activator mechanism 220 illustrated in the lower portion of the mint-gum unit 42 and only the mint and gum activator mechanism 220 illustrated in the bottom portion of the mint-gum unit 42 will be explained in detail. The drive arms 216 are connected to the mint and gum activator mechanisms 220 through slots 222 provided in the drive arms 216. A pair of drive pins 224 connected to the mint and gum activator mechanism 220 are positioned in a pair of elongated drive slots 226 formed in the mint-gum unit 42. The portions of the pair of drive arms 216 adjacent the bottom of slot 222 are positioned in circular grooves 221 in the pair of drive pins 224. The pair of drive pins 224 extend through the pair of elongated drive slots 226 and are connected at their other ends to the mint and gum activator mechanism 220 by pins 223. Pins 223 extend through the mounting bracket 230 of the activator drive mechanism 220 and the drive pins 224 and are held in place by retaining rings 228.

The mint and gum activator mechanisms 220 each comprise a mounting bracket 230 upon which are mounted selector units 232. In the illustrated embodiment of the invention, the selector units 232 comprise a pair of selector arms 234 and 236, which are mirror images of one another. The selector arms 234 and 236 are connected together as a unit and the selector units 232 are bolted to the mounting bracket 230 by means of machine screws 238. As stated the mounting bracket 230 is connected to a pair of drive pins 224 and can be fastened thereto in any convenient manner.

Figures 23, 24:
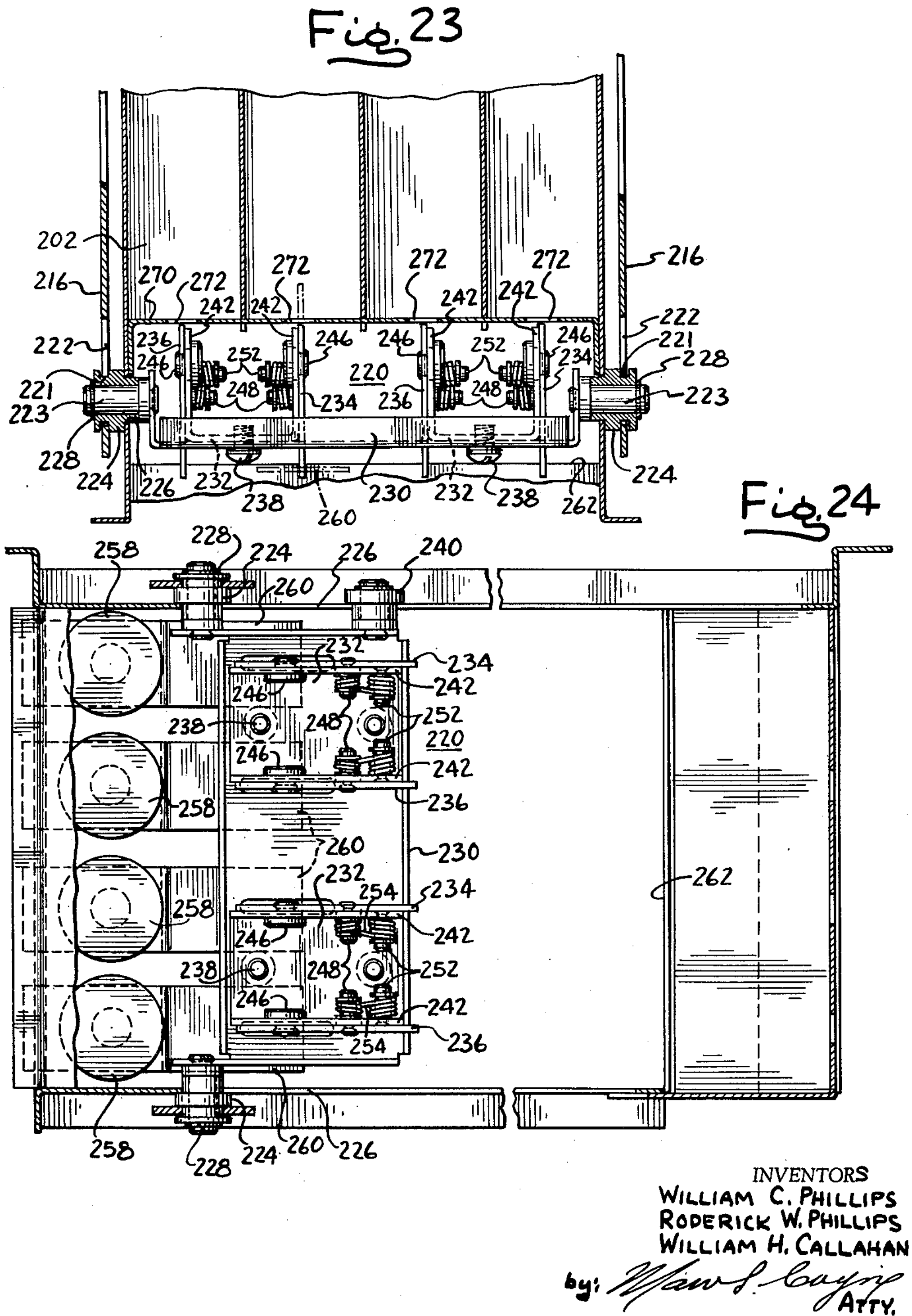
FIG. 23 is a partial cross-sectional view of the mint-gum unit illustrating the mint-gum activator mechanism in more detail.
FIG. 24 is a partial cross-sectional view of the mint-gum unit illustrating the top view of the mint-gum activator mechanism.

An auxiliary drive pin 240 is connected to the mounting bracket 230 and is positioned in one of the pair of elongated drive slots 226 as can be seen in FIG. 24 of the drawings. Drive pin 240 reduces binding and smoothes the oscillatory movement of the activator mechanisms 220 in the slots 226. Each selector unit 232 is comprised of a stationary plate member 242, formed in a U-shape, and two movable arm members 234 and 236. The movable arm members 234 and 236 are pivotally connected to the stationary plate member 242 by means of pins 246 which are connected to the stationary plate member 242 and movable arm members 234 and 236 in any manner and in the embodiment illustrated in the drawings, the pins 246 have one of their ends turned over or flattened out so as to retain the movable arm members 234 and 236 in a pivotal relationship. Each movable arm member 234 or 236 has a spring post 248 positioned thereon and attached thereto and the spring post 248 extends through an elongated slot 250 positioned in the stationary plate member 242. The length of the elongated slot 250 in the stationary plate member 242 determines the freedom of movement of the movable arm member 234 or 236 with respect to the stationary plate member 242 because the spring post 248 extends through the elongated slot 250 and the extent of movement of the movable arm member 234 or 236 will necessarily be restricted by the elongated slot 250. A second spring post 252 is mounted on each stationary plate member 242 and an over-center spring 254 is wrapped around the spring post 248 and the spring post 252 and extends therebetween and because of the nature of the over-center spring 254 biases the removable arm member 244 to either one end or the other end of the elongated slot 250, that is, either the upper end or the lower end of the elongated slot 250.

The movable arm member 234 or 236 has an actuator arm 256 formed thereon and when the actuator arm 256 is moved from one position to the other, the over-center spring 254 secures the movement. The over-center spring 254 initially resists movement but after a predetermined movement of spring 254 the center position of the spring is reached and thereafter spring 254 aids in further movement, so as to give a positive positioning of the movable arm member 234 or 236 in either one of two positions. Therefore, the movable arm member 234 or 236 can be moved into one of two positions, as shown clearly in FIGS. 23 and 25 in solid and dotted lines.

A plurality of selector magnets 258, one each for each movable arm member 234 and 236 is positioned rearwardly in the mint-gum unit 42 (FIGS. 21 and 25) and each is provided with a pivotal armature 260 that is activated by the selector magnets 258 to an operate position (FIG. 25), where the pivotal armature 260 engages the actuator arm 256 of a movable arm member 234 or 236 to actuate or rotate the movable arm member 234 or 236 into a dispense position (FIG. 25 dotted lines). A deactivator bracket 262 is positioned forwardly in the mint-gum unit 42 and for the purpose of engaging the actuator arm 256 when the mint and gum selector mechanism 220 moves to the front of the machine to move the movable arm member 234 or 236 from its dispensing position back to its normal position (FIG. 25 solid lines), and this is accomplished by the actuator arm 256 engaging and being moved from its dispensing position back to its normal position by the de-activator bracket 262. As can be seen, the mint and gum actuator mechanism 220 moves completely behind the merchandise to be dispensed inasmuch as the actuator movable arm member 234 or 236 must be put into a dispense position before it can engage the rear of the article to be dispensed.

A front dispensing door 264 (FIG. 25), is pivotally secured to the mint and gum unit 42 and serves the purpose of activating a micro-switch 266 if the door is moved by an article being dispensed.

The articles of merchandise to be dispensed are supported on bottom support sections 270 under which the mint and gum activator mechanisms oscillate back and forth when in use. However, a plurality, four in number, of bottom support slots 272 are provided, FIGS. 23 and 25, in each bottom support section 270; one for each merchandise storage section 200 or 202 to enable the articles of merchandise to be pushed out of the front of the mint and gum unit by activated upwardly extending movable arm members 234 or 236 of the mint and gum activator mechanisms 220 as will be seen in the section herein entitled Operation.

THE SELECTOR MECHANISMS

The candy-pastry selector mechanism 46 and the mint-gum selector mechanism 48 are functionally equivalent although they need not be physically identical in every detail. For example, the configuration of the buttons that are activated in the candy-pastry selector mechanism 46 may not be of the same shape as those in the mint-gum selector mechanism 48. In FIG. 1, the buttons of the mint-gum selector mechanism 48 are circular in configuration and the buttons of the candy-pastry selector mechanism 46 are generally rectangular in configuration and also the candy-pastry selector mechanism is inclined to the front face of the front door 14.

Reference is had to FIGS. 26 through 30 wherein the candy-pastry selector mechanism 46 is illustrated. The candy-pastry selector mechanism 46 comprises a rectangular selector support member 300 extending almost the entire length of the candy-pastry mechanism 46 on which the various components of the candy-pastry selector mechanism 46 are mounted. A plurality of selector push buttons 302 are mounted through the front face 304 of the rectangular selector support member 300 and extend through the rear face 306 of the rectangular selector support member 300. The plurality of selector push buttons 302 each have formed thereon a first spring actuator 308, a second spring actuator 310, and a retainer pin 312. The first spring actuator 308, the second spring actuator 310, and the retainer pin 312 of the selector push button 302 can all be of circular configuration and the particular procedure used for rigidly securing the first spring actuator 308, the second spring actuator 310, and the retainer pin 312 to the selector push button 302 within the rectangular selector support member 300 is not of inventive importance as this can be done by any means known to those skilled in the art.

Slidably positioned with respect to the rectangular selector support member 300 are a plurality of selector actuator assemblies 314. The selector actuator assemblies 314 are positioned in and slidably guided by a plurality of actuator slots 316 which are elongated in configuration as can be clearly seen. The selector actuator assemblies 314 each comprise an L-shaped clutch plate 318 positioned on the inside of the rectangular selector support member 300 and an actuator pin assembly 320. The actuator pin assembly 320 comprises a flat plate 322 connected to the L-shaped clutch plate 318 by a plurality of rivets extending through the actuator slot 316 and an actuator pin 324. Positioned between the L-shaped clutch plate 318 in the selector actuator assembly 314 and the first spring actuator 308 of the selector push button 302 is a clutch spring 326.

Figures 26, 27, 29:
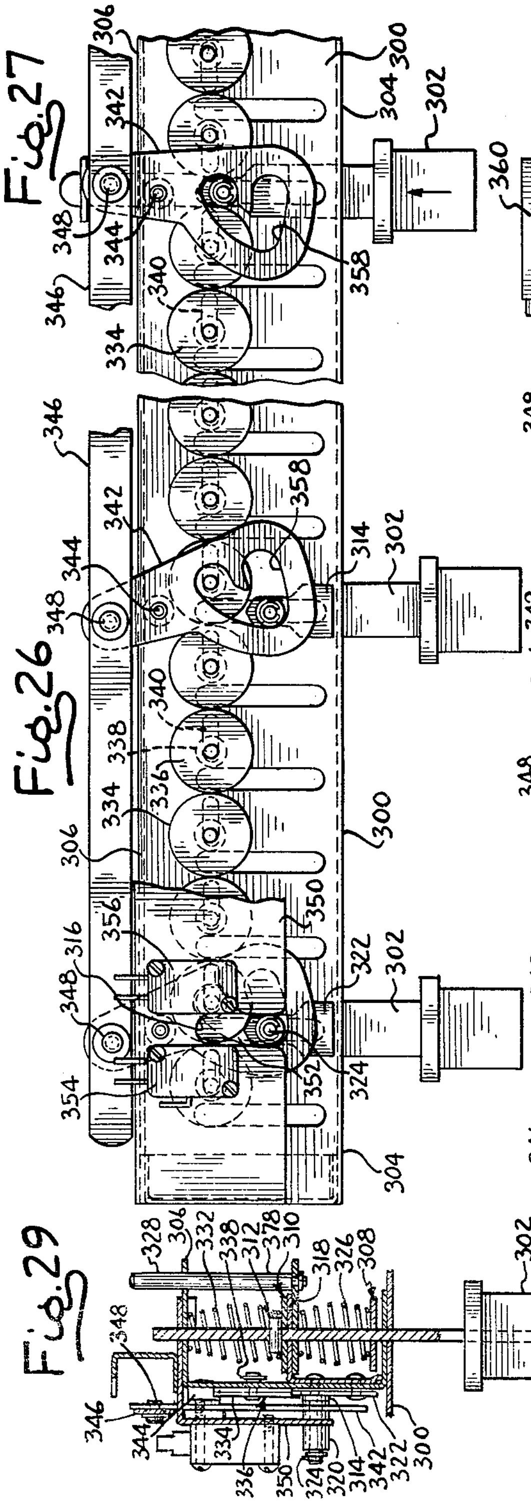
FIG. 26 is a partially cut away fragmentary top view of one end of the candy-pastry selector mechanism utilized in the vending machine illustrated in FIG. 1 and showing the selector mechanism in a de-energized condition.
FIG. 27 is a cutaway fragmentary top view of a center portion of the candy-pastry selector mechanism utilized in the vending machine illustrated in FIG. 1 and showing the selector mechanism in an energized condition.
FIG. 29 is a cross-sectional side view of the candy-pastry selector mechanism showing a selector push button and cooperating associated parts.

In order to prevent the actuation of the selector mechanism when the delivery door 54 is open, a delivery door senser 328 is connected to the clutch plate 318 by any means and is positioned relative to clutch plate 318 as can be seen in FIG. 29. The function and purpose of the delivery door senser 328 will be explained more fully.

Positioned between the second spring actuator 310 of the selector push button 302 and the rear wall 306 of the rectangular selector support member 300 is return spring 332. The return spring 332 is not as strong as the clutch spring 326 and the reason therefor will be explained later.

Figures 28, 30:
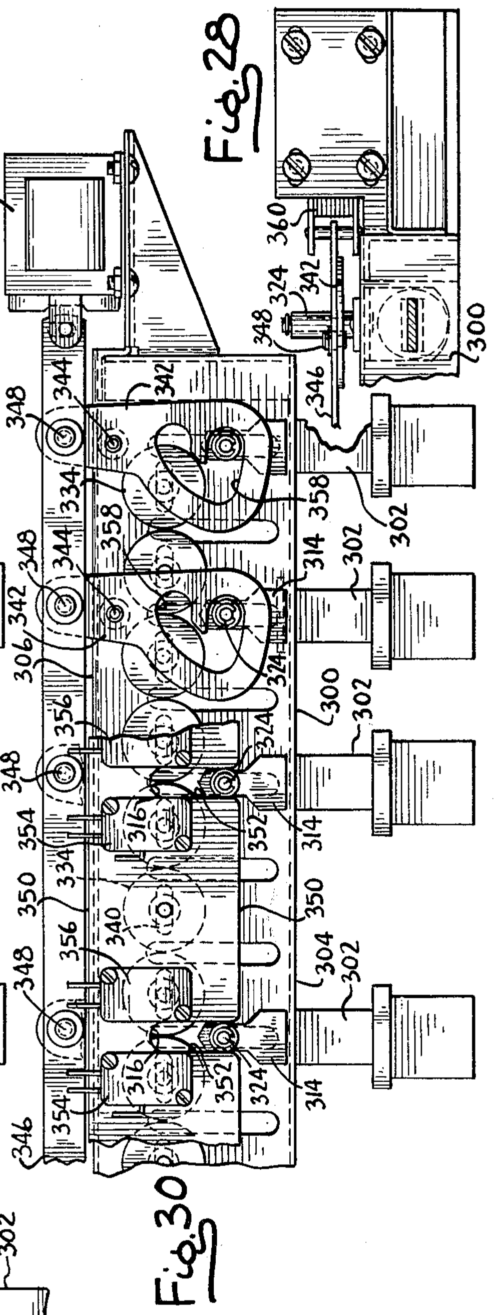
FIG. 28 is a fragmentary front view of a portion of the candy-pastry selector mechanism illustrated in FIG. 30 partially showing the solenoid lock in assembly.
FIG. 30 is a fragmentary partially cutaway top view of the other end of the candy-pastry selector mechanism utilized in the vending machine illustrated in FIG. 1 showing the position of the non-activated push buttons and associated parts after another push button activates the selector mechanism.

Positioned on the upper side of the rectangular selector support member 300 as seen in FIGS. 26, 27 and 30 are a plurality of anti-cheat washers 334. The anti-cheat washers 334 have a large circular face 336 and a small circular face 338 positioned on opposite sides of an associated elongated anti-cheat slots 340 formed in the rectangular selector support member 300 as can be clearly seen in the drawings. The large circular face 336 and the small circular face 338 of the anti-cheat washers 334 are joined together through elongated anti-cheat slot 340 by a rivet or any other appropriate means. The elongated anti-cheat slots 340 are formed in the rectangular selector support member 300 and extend parallel to the longest sides thereof as can be seen in the drawings. The diameter of the large circular face 336 of the anti-cheat washers 334 and the length of the elongated anti-cheat slots 340 are so related that when an actuator pin 324 is pushed between two adjacent anti-cheat washers 334, no other actuator pin 324 of any actuator pin assembly 320 can be inserted between any two adjacent anti-cheat washers 334. Also, it is impossible to have two actuator pins 324 inserted simultaneously between any two adjacent anti-cheat washers 334 inasmuch as there is not enough room.

Associated with each actuator pin assembly 320 is a locking cam 342. Each locking cam 342 is pivotally connected to the rectangular selector support member 300 by a first pivot pin assembly 344 of any known type. Each locking cam 342 is further connected to a common locking bar 346 by a second pivot pin assembly 348 which also can be of any known type. A micro-switch mounting plate 350 is welded or otherwise connected to the rectangular support member 300 and is provided with a plurality of actuator pin slots 352 which permit the actuator pins 324 of the actuator pin assemblies 320 to freely move in their associated actuator slots 316. Positioned on the micro-switch mounting plate 350 adjacent each slot 352 are a pair of micro-switches 354 and 356 which can be utilized to energize a locking bar solenoid 360 as will be explained. Each locking cam 342 has formed therein a cam surface 358 adapted to cause the lateral movement of the locking bar 346 when the associated actuator pin 324 engages the cam surface 358, all as will be explained.

After the selector mechanism has been assembled as previously described, it operates and functions in the following manner. When a purchaser desires to select a particular item corresponding to a pre-determined selector push button 302, the purchaser pushes a selected selector push button 302 inwardly as viewed in the drawings. Rigidly connected second spring actuator 310 compresses the return spring 332 and the selector push button 302 continues its inward movement. The second spring actuator 310 of the selector push button 302 moves away from the upright face of the L-shaped clutch plate 318. However, the clutch spring 326 exerts a force against the opposite side of the upright face of the L-shaped clutch plate 318 and also drives the clutch plate 318 in an inward direction, thus the selector actuator assembly 314 moves inwardly, causing the actuator pin assembly 320, including the actuator pin 324 to move inwardly through the actuator pin slot 352 of the micro-switch mounting plate 350 and the actuator slots 316 of the rectangular selector support member 300, and the actuator pin 324 also moves against the cam surface 358 of the locking cam 342. As the actuator pin 324 bears against the cam surface 358 of the locking cam 342 as it moves inwardly it moves the locking cam 342 to the left in a clockwise movement thus moving the locking bar 346 to the right as viewed in the drawings, FIGS. 26, 27 and 30. Inasmuch as every locking cam 342 is pivotably connected to the locking bar 346 they must all move with the locking bar 346 thus forcing all the remainder of the locking cams 342 to be rotated to the left or clockwise and the locking bar 346 is moved to the right. The final position of the actuator locking cam 342 and associated actuator pin 324 associated with the selected push button 302 is illustrated in FIG. 27, and the final position of the remainder of actuator pins 324 and locking cams 342 associated with the unselected push buttons 302 is shown in FIG. 30.

As the actuator pin 324 moves between the anti-cheat washers 334, each washer to the left of the actuator pin 324 is moved so that it is positioned as far to the left in its associated elongated anti-cheat slot 340 as is possible and each anti-cheat washer 334 to the right of the energized actuator pin 324 is moved as far to the right in its associated elongated anti-cheat slot 340 as is possible. Thereafter, no other actuator pin 324 can move between any anti-cheat washers 334 until the actuator pin 324 has been released from its inward activated position.

During its inward movement, the actuator pin 324 energizes its pair of associated micro-switches 354 and 356, thus energizing the locking bar solenoid 360. The energization of locking bar solenoid 360 exerts a force on the locking bar 346 to help maintain the locking bar to the right as viewed in the drawings, thereby locking in the actuator pin 324.

DELIVERY DOOR INTERLOCK ASSEMBLY 400

Figure 31:
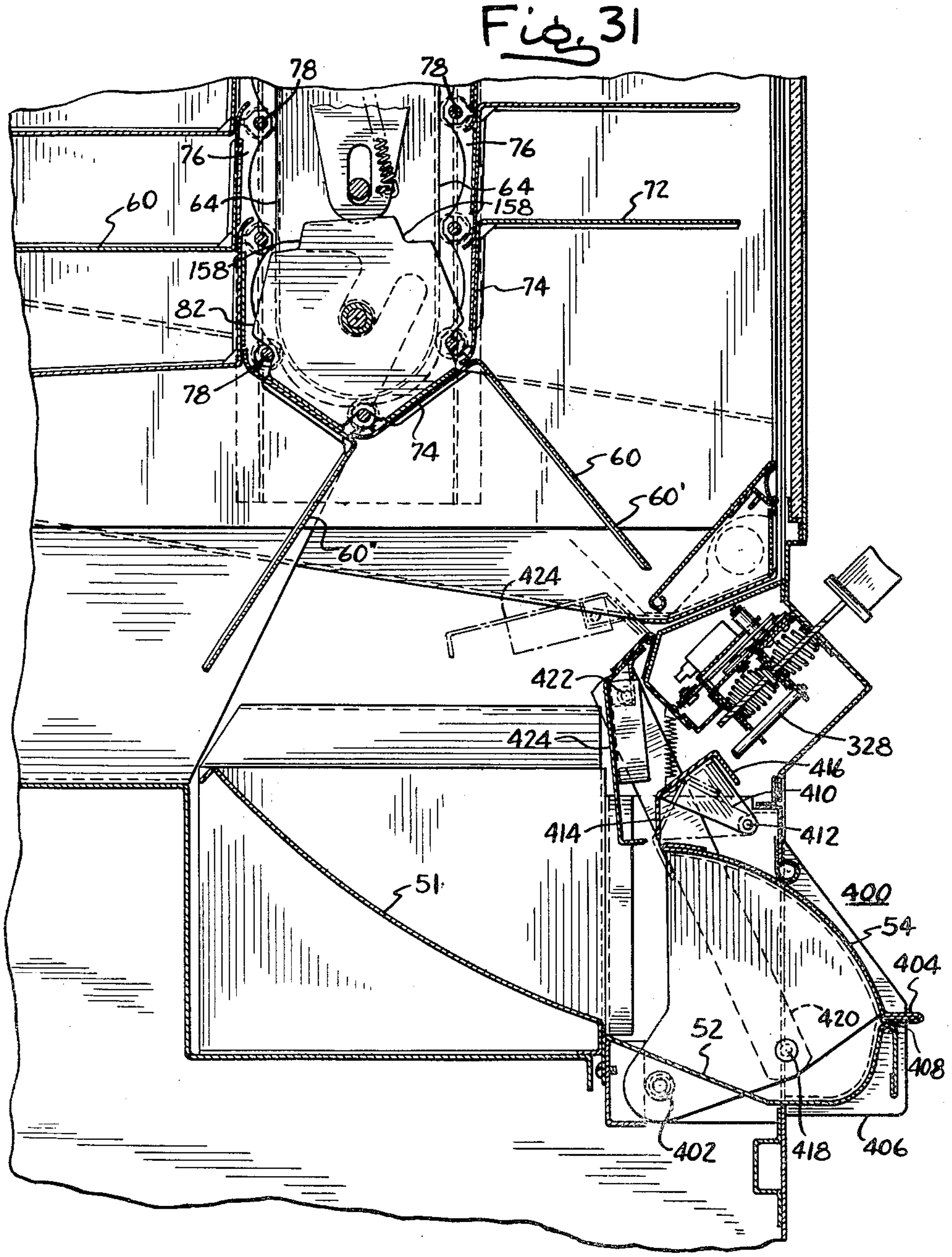
FIG. 31 is an enlarged cross-sectional side view of the vending machine illustrated in FIG. 1 showing the delivery door interlock assembly.
Figures 32, 33:
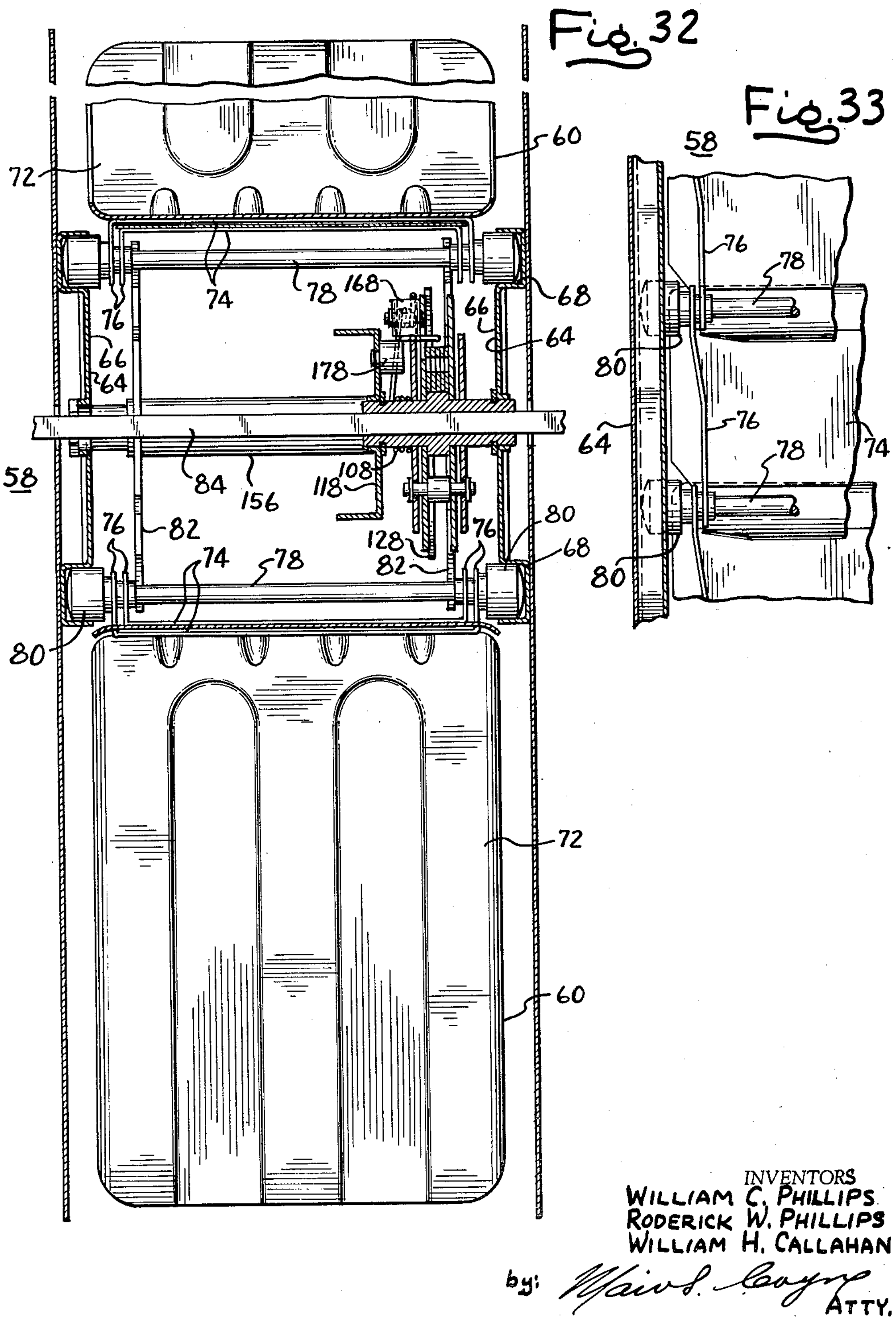
FIG. 32 is a cross-sectional view through one column of a candy-pastry unit.
FIG. 33 is an enlarged fragmentary cross-sectional view of a candy-pastry unit illustrating the interconnection of succeeding L-shaped shelves.

A vending machine incorporating the features of the invention is provided with a delivery door assembly 400 comprising an inner delivery tray 51 and an outer delivery tray 52 and a delivery door 54, best illustrated in FIGS. 4, 9 and 31 and readily secured in the vending machine 10 by any means. The candy-pastry selector mechanism 46 is constructed with a delivery door senser 328 to prevent the vending of any merchandise from the candy-pastry units 20 and 22 when the delivery door 54 is in an open position. The delivery door 54 is also constructed so that when it is in its open position, a potential pilferer cannot gain access to the merchandise within the vending machine.

Referring to the drawings, especially FIGS. 4, 9 and 31, there is shown an inner delivery tray 51 secured in the vending machine 10 below the candy-pastry units 20 and 22 and onto which the merchandise in the vending machine falls during dispensing of the merchandise to the purchaser. The merchandise travels down inclined inner delivery tray 51 to the outer delivery tray 52 formed on front door 14 and under the delivery door 54. The delivery door 54 is pivotally attached to the front door 14 at pivot points 402 on each end of the delivery door 54. When delivery door 54 is opened it moves upwardly and inwardly exposing the delivery tray 52 to the purchaser. The delivery door 54 is shaped somewhat like a sector of a cylinder and pivots about pivot points 402 and moves upwardly and rearwardly or counterclockwise as viewed in FIG. 31. The delivery door 54 has an extended tab portion 404 integrally formed thereon for easy gripping by the purchaser for opening and closing of the delivery door 54. The delivery tray assembly 400 is also composed of a bottom extended portion 406 that projects forwardly from the front door 14 and which is shaped so as to provide a delivery door stop portion 408. A delivery door position bracket 410 is pivotally connected to brackets not shown that are secured to the front door 14 of the vending machine 10 and the delivery door position bracket 410 is pivotal about pivot points 412. The delivery door position bracket 410 has a downwardly extending activator leg 414 and a delivery door senser engaging member 416. The delivery door position bracket 410 is normally spring biased to the position shown in FIGS. 9 and 31 by a plurality of tension springs 411.

When the delivery door 54 is opened and moved upwardly and inwardly, the outer surface thereof moves past the downwardly extending activator leg 414 of the delivery door position bracket 410. If a push button 302 in the selector mechanism 46 is then depressed the delivery door senser 328 thereof moves downward and engages the delivery door senser engaging member 416 and rotates the delivery door position bracket 410 in a counterclockwise position as viewed in FIGS. 9 and 31. The downwardly extending activator leg 414 of the delivery door position bracket 410 will quickly engage the outside of the delivery door 54 and further movement thereof is arrested. Thereafter the delivery door senser engaging member 416 will remain held in contact with the delivery door senser 328 of the selector push buttons 302. The actuator pin assembly 320 of the push button 302 cannot move as movement is blocked by the second spring actuator 310, see FIG. 29. The second spring actuator 310 is not capable of moving because it is rigidly connected to the delivery door dispenser 328, which is stopped from movement by the delivery door senser engaging member 416. Thus it can be seen that when the delivery door 54 is open, the candy-pastry selector mechanism 46 is inoperative. The push buttons 302 themselves will move in and out against the clutch spring 326 and the return spring 332 but the actuator pin assembly 320 will not move.

Pivotally connected at pivot point 418 on each side of the delivery door 54 are a pair of extension arms 420. The extension arms 420 are pivotally connected at pivot points 422 to the outside of a somewhat C-shaped anti-pilfering bracket 424 and are adapted to move said bracket from its normal position, as shown in solid lines in FIGS. 9 and 31, to its blocking position, as shown in dotted lines in FIG. 31. If a potential pilferer opens the delivery door 54 and attempts to extend his hand into the vending machine, the C-shaped anti-pilfering bracket 424 will prevent the pilferer from having any opportunity to dislodge any of the merchandise from its stored position in the L-shaped shelves 60.

If a push button 302 is pushed in and the door 54 is properly closed the delivery door senser 328 thereof will cause the delivery door position bracket 410 to pivot and rotate about pivot points 412 thus causing the downwardly extending activator leg 414 to rotate around the inside end of delivery door 54 as shown in dotted lines in FIG. 31. As has been explained when a push button 302 causes the solenoid 360 to be activated it is locked in its active position until solenoid 360 is deenergized. Therefore, it will be impossible to open the delivery door 54 until the vend cycle has been completed and the solenoid 360 is deenergized. Thereafter springs 411 will rotate the delivery door position bracket 410 to its normal position.

THE CABINET SUPPORT FOOT ASSEMBLY 500

It is preferred that when vending machines are utilized at any given location, they be firmly attached to a strong support such as a wall, so that there will be absolutely no danger of the vending machines tipping over and injuring someone. In the particular vending machine illustrated in the drawings, the machine is loaded and unloaded from the front by opening the front door 14 and then rotating frontwardly and downwardly the candy-pastry units 20 and 22 and sliding the gum and mint unit forward. In order to prevent any possible tipping of the vending machine 10, the vending machine 10 is provided with a cabinet support foot assembly 500, which is illustrated in FIGS. 2 through 8.

The cabinet support foot assembly 500 comprises a supporting foot element 502, which is adjustable in length and comprises two parts, an inner supporting foot element 504 and an outer supporting foot element 506. Both the inner supporting foot element 504 and the outer supporting foot element 506 are U-shaped and the inner supporting foot element 504 is positioned within the outer supporting foot element 506, and is slidably movable with respect thereto. The inner supporting foot element 504 is movable inwardly and outwardly within the outer supporting foot element 506, and can be locked to the outer supporting foot element 506 in a number of positions, and this can be readily provided, for example, by forming a slot in the outer supporting foot element 506 and a corresponding slot in the inner supporting foot element 504 and interconnecting the slots by a nut and bolt arrangement.

The upper end of the outer supporting foot element 506 has the U-shaped sides cut away and is formed over at an angle, as can be best seen in FIG. 7. The outer supporting foot element 506 is secured to the vending machine 10 as shown in FIG. 4, and by a pin 508 having a biasing spring 510 positioned between itself and the upper end of the outer supporting foot element 506. The cabinet support foot assembly 500 also comprises a front door link 512 that is pivotally attached at one end for up and down and sideways movement in pivot bracket 524 which in turn is secured to front door 14. The front door link 512 can therefore pivot at the same time in both a vertical and horizontal plane with respect to the front door 14. The front door link 512 is twisted approximately 90° near its end closer to the outer supporting foot element 506 and is rotatably connected to the outer supporting foot element 506 at rotatable bracket 526 and also can pivot up and down and sideways and combinations thereof. Bracket 526 is rotatable within the outer supporting foot element 506 and this can be provided by pinning bracket 526 to the foot element 506.

The cabinet support foot assembly 500 also comprises a cabinet link 518. The cabinet link 518 is pivotally attached to the cabinet and to the outer supporting foot element 506 for pivotal movement up and down and sideways by means of pivot brackets 520 and 522, respectively, and the cabinet link 518 can pivot in vertical and horizontal directions and combinations thereof with respect to the cabinet and foot supporting element 506. The pivot bracket 520 is connected to a provided cabinet link fastening post 530 rearwardly from the securement of the outer supporting foot element 506. If it were not so the foot element 506 would not move both downwardly and outwardly when the front door 14 is opened and as will be explained. A cabinet supporting foot positioning beam 528 is positioned in the cabinet 12 forwardly of the cabinet link fastening post 530. This enables a triangle to be formed bounded by the supporting foot element 502, the cabinet link 518 and a line between their inner pivot points. The triangle is dipped forwardly and toward the floor when the vending machine support assembly 500 is in its open position. The door link 512 acts mainly as a stop and the adjustability of the inner and outer supporting foot elements 504 allows for error in choosing the length of the cabinet link 518 or non-level condition of the floor surface and the like.

OPERATION

Generally, the vending machine 10 is comprised of two candy-pastry units 20 and 22, each of which candy-pastry units has a plurality of endless chain-type shelf mechanisms 58 independently and selectively rotatable within the candy-pastry units and operable responsive to the activation of the push button in the candy-pastry selector mechanism 46 corresponding to the particular chosen endless chain-type shelf mechanism 58. Also positioned in the vending machine 10 is the mint and gum unit 42. The mint-gum unit 42 is operable responsive to the selection of a particular mint or gum and through the use of the mint and gum selector mechanism 48 and as with the candy-pastry units 20 and 22, means are provided for delivering the selected articles of merchandise to the delivery tray 52 under the delivery door 54. As was discussed in the section entitled "Delivery Door Interlock Assembly 400," the candy-pastry selector mechanism 46 cannot be energized if the delivery door 54 is not in a closed position. Also, means are provided to inhibit a potential pilferer from reaching his hand into the machine through the aperture covered by delivery door 54 and remove any of the articles of merchandise within the machine. Further, a vending machine support assembly 500 is provided to insure that when the front door 14 of the vending machine 10 is in an open position, the vending machine 10 is prevented from tipping forward.

Assume now that the vending machine 10 has been assembled at the factory and it has been shipped for purposes of placing the vending machine 10 in operation. As previously stated, the candy-pastry units 20 and 22 are pivotally mounted and normally maintained in an upright position in the cabinet 12. The candy-pastry units 20 and 22 have mounting pins 24 securely attached to each side. The mounting pins 24 and consequently the candy-pastry units 20 and 22 are slidably positioned in slots formed in candy-pastry support brackets 26 that are in turn securely fastened, to the cabinet 12. The candy-pastry units 20 and 22 are therefore pivotally mounted within the cabinet 12 and can be swung out for loading as illustrated in FIGS. 2 and 3 and as will be described.

Initially the front door 14 of the vending machine 10 is opened by swinging the front door 14 on its hinge 16. As the front door 14 of the vending machine 10 swings open, the vending machine support assembly 500, which is attached through its three main parts, the supporting foot element 502, the front door link 512, and the cabinet link 518, to a cabinet supporting foot positioning beam 528, the front door 14 and the cabinet link fastening post 530 respectively swings open as sequentially illustrated in FIGS. 7, 6 and 5.

The supporting foot element 502 swings outwardly and downwardly pivoting on its foot positioning beam 528 with spring 510 preventing sticking and slipping. The cabinet link 518 pivots downwardly and outwardly as does the front door link 512 all as can be seen in FIG. 7 through 5 sequentially illustrating various positions of the vending machine support assembly 500 as it swings from a closed position to an open position. The front door link 512 can be made longer or shorter depending upon how far the front door 14 is desired to be opened.

Referring more particularly to FIGS. 8 and 9, there is illustrated a pair of flexible plastic curtains 180 and 182 slidably positioned around the endless chain-type shelf mechanisms 58 comprising the candy-pastry units 20 and 22, respectively. The flexible plastic curtains 180 and 182 are mounted on clips gripping the outside edges of each candy-pastry unit 20 and 22 enabling the plastic curtains 180 and 182 to slide along the outside edges of the candy-pastry unit 20 and 22. The flexible plastic curtains 180 and 182 are movable from behind the candy-FIG. 8. Each of the flexible plastic curtains 180 and pastry units 20 and 22 as shown in FIG. 9 to the front of the candy-pastry units 20 and 22, as illustrated in 182 has formed on the end thereof a latching arm release element 184. As the flexible plastic curtains 180 and 182 are moved from their normal position in the rear to the front of the candy-pastry units 20 and 22, the latching arm release elements 184 engage gravity-biased pivotal latching bar stops 39. The gravity-biased pivotal bar stops 39 normally negage the latching bars 38 as shown in FIG. 9 and will only engage the latching bars 38 of the candy-pastry units 20 and 22 when the candy-pastry units 20, 22 are in their normal upright position. However, as the latching arm release elements 184 move up behind the candy-pastry units 20 and 22, when the flexible plastic curtains are being moved from the rear to the front of the candy-pastry units 20 and 22, they engage the gravity biased latching bar stops 39 and move them upwardly, thus enabling the candy-pastry units 20, 22 to be pivoted forwardly in a downward and outward direction, as viewed from the front of the vending machine 10.

The pivotal latching bar stop 39 will not be disengaged from its associated latching bar 38 until its associated flexible plastic curtain 180 or 182 has been pulled completely down in front of the candy-pastry unit and this is accomplished by properly positioning the latching arm release elements 184 on the flexible plastic curtain 180 and 182 thus preventing the accidental discharge of articles of merchandise onto the floor in front of the vending machine 10 when the candy-pastry units 20 and 22 are being pivoted downwardly. The candy-pastry units 20 and 22 therefore cannot be moved until the front portions thereof are protected by the flexible plastic curtains 180 and 182 insuring that any articles of merchandise positioned in front of the candy-pastry units 20 and 22 will not fall on the floor.

After the flexible plastic curtains 180 and 182 have been moved to their front position, the candy-pastry units 20, 22 can be pivoted forward to enable loading of the rear of the candy-pastry units to take place. When either of the candy-pastry units 20 or 22 is pivoted forward its associated cable 31 is of course played out. Since the upper end of the cable is attached to the upper portion of the candy-pastry units 20 or 22 and the lower end of said cable is attached to pulley 34, which in turn winds up the torsion spring 30, there is provided a retarding force against the forward pivotal movement of the candy-pastry units 20 and 22 thereby making it much easier to pivot the candy-pastry units 20 and 22 inasmuch as the party pivoting these units will not have to support the weight of the candy-pastry units as they pivot forward.

After a candy-pastry unit 20 or 22 has been pivoted forward to a position determined by stop member 40 on cable 31 articles of merchandise can be inserted into the L-shaped shelves 60 in the rear of the endless chain-type shelf mechanisms 58. After the rear shelves have been loaded the candy-pastry unit 20 or 22 is returned to its straight up position by pivoting in the opposite direction until it is locked in place when the latching bar 38 is engaged by the gravity biased latching bar stop 39. Thereafter, the flexible plastic curtain 180 or 182 may be moved back around the outside of the candy-pastry unit 20 or 22 and back to its normal position, as illustrated in FIG. 9 and the front shelves of the candy-pastry unit 20 or 22 are then loaded.

Figures 21, 22:
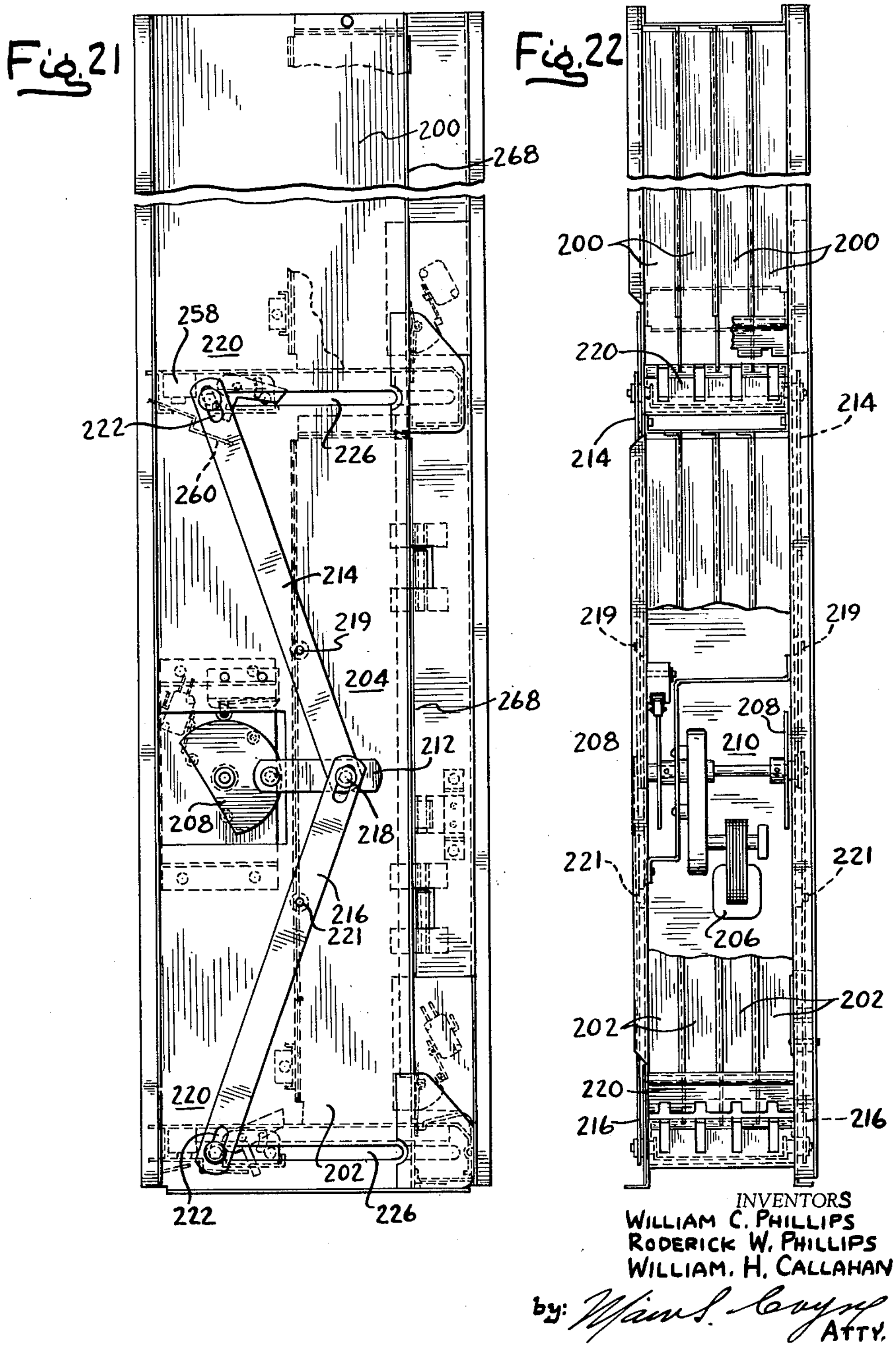
FIG. 21 is a side view of the mint-gum unit utilized in the vending machine illustrated in FIG. 1.
FIG. 22 is a front view of the mint-gum unit illustrated in FIG. 21.

The mint-gum unit 42 can be loaded with articles of merchandise, such as gum and mint, for example, and these articles or merchandise are positioned in the four upper merchandise storage sections 200, and the four lower merchandise storage sections 202, as seen in FIGS. 21, 22 and 23. The mint-gum unit 42 is provided with two front hinged doors 268 which are swung open for loading and the articles of merchandise are then stacked one on top of the other on the bottom support sections 270 in the merchandise storage sections 200 and 202. After loading is completed and the hinged doors 268 are closed, the front door 14 of vending machine 10 is swung shut. As the front door 14 swings shut the vending machine support assembly 500 automatically moves itself from its supporting position, as illustrated in FIGS. 2, 3 and 4 to its rest position (FIG. 7) sequentially as illustrated in FIGS. 5, 6 and 7.

When the front door 14 is shut and latched, by means not shown, the articles of merchandise positioned in the front bottom L-shaped shelves 60 which will be the first articles dispensed from the vending machine will be visible through the transparent windows 56. In other words, all of the articles of merchandise that are positioned in the L-shaped shelves 60 of each endless chain-type shelf mechanism 58 which will be dispensed upon the next energization of their associated endless chain-type shelf mechanism 58 will be visible to the purchaser through the transparent windows 56. This insures that the purchaser can see what article he or she is choosing and this enables the candy-pastry units 20 and 22 to be loaded with a variety of articles of merchandise inasmuch as each endless chain-type shelf mechanism 58 need not be loaded with the same type merchandise. This may have some undesirable effects inasmuch as one item may possibly appeal to no one. However, the versatility is still built into the vending machine.

Assume now that a pilferer decides to lift the delivery door 54 pivoting it at its pivot points 402 moving the delivery door upwardly and inwardly as viewed in the drawings and especially FIGS. 9 and 31. A pilferer would then use either his hands or some other instrument to reach up into the endless chain-type shelf mechanisms 58 to dislodge the article of merchandise next to be dispensed from its associated L-shaped shelf 60. However, and as has been previously explained, as soon as the delivery door 54 is opened, the N-shaped antipilfering bracket 424 which is movable in unison with the delivery door 54 moves into its guard position as shown in dotted lines in FIG. 31, thereby inhibiting any potential pilferer from dislodging any of the merchandise from the endless chain-type mechanisms 58.

The candy-pastry selector mechanism 46 is illustrated in FIGS. 26 through 30. The mint-gum selector mechanism 48 is almost exactly the same except that no delivery door senser 328 is provided. Assume, for example, that the candy-pastry mechanism 46 is activated. The purchaser initially chooses the item or article of merchandise that he or she desires and then inserts the correct amount of change into the vending machine 10. The change is delivered to an accumulator and escrow circuit (not shown) where the change is recorded and stored in escrow pending further action by the purchaser in either selecting a desired article of merchandise or in pushing the coin-return push button (not shown). The accumulator and escrow circuit relays the information of the stored coins into a coin registration switch (not shown) which in turn relays this information to a price change board (not shown).

Next the candy-pastry selector mechanism 46 is activated by the inward movement of any of the selector push buttons 302. As was previously explained the anti-cheat washers 334 and the elongated anti-cheat slots 340 are so arranged that only one actuator pin 324 can move between these anti-cheat washers 334. Any effort by a purchaser to depress two selector push buttons 302 would not meet with success inasmuch as two actuator pins 324 just cannot fit between the anti-cheat washers 334. As the selector push button 302 moves inwardly of the rectangular selector support member 300, the clutch spring 332, which is not as strong as the return spring 326 compresses. The second spring actuator 310 moves in with the selector push button 302 and the L-shaped clutch plate 318 is moved inwardly with the first spring actuator 308 under force from the clutch spring 326, thus moving the actuator pin assembly 320 rigidly connected to the L-shaped clutch plate 318 including the actuator pin 324 inwardly. The actuator pin 324 therefore moves in the actuator pin slot 352 of the micro-switch mounting plate 350 and activates the pair of micro-switches 354 and 356. One of the pair of micro-switches 354, 356 closes the circuit (not shown) to the locking bar solenoid 360, thus moving the locking bar 346 further to the right as viewed in the drawings. This helps pivot all the locking cams 342 to the left or rotates the locking cams 342 clockwise thus retaining the actuator pin 344 of the activated selector push button 302 in the position as illustrated in FIG. 27 and thus positioning all the remainder of the actuator pins 324 of the selector push buttons 302 in the position as illustrated in FIG. 30. The selector push button 302 which has been activated will remain in the position as illustrated in FIG. 27 until the merchandise has been dispensed because a cycle hold in circuit (not shown) will maintain the locking bar solenoid 360 energized.

After the selector mechanism 46 has been energized, the coins registered in the coin registration switch are compared with the price marked in the price change board for the particular selected article of mechandise and if they correspond, a candy-pastry unit control relay (not shown) corresponding to the properly selected candy-pastry unit either 20 or 22 is energized and the drive motor 86 associated with the particular candy-pastry unit 20 begins its one cycle operation. The drive motor 86 rotates a chain and sprocket arrangement, partially illustrated in FIG. 11 and which can be provided by anyone skilled in the art and rotates a common drive shaft 84. The common drive shaft 84 extends through each of the endless chain-type shelf mechanisms 58 associated in the particular candy-pastry unit 20 or 22 and begins to rotate each and every of the drive pin moving mechanisms 90 positioned in that particular candy-pastry unit either 20 or 22.

Referring to FIG. 13, if the candy-pastry selector mechanism 46 has activated the selector relay 160 corresponding to a particular endless chain-type shelf mechanism 58 as shown in FIG. 13, then the movement of the drive pin moving mechanism 90 of that particular endless chain-type shelf mechanism 58 will in time turn the drive sprockets 82 and therefore the L-shaped shelves 60 one dispensing position as will be explained.

As soon as the selector relay 160 associated with the endless chain-type shelf mechanism 58 selected to be operated is energized, the armature 162 moves towards the relay core, as illustrated in dotted lines in FIG. 13. Thereafter, as illustrated in FIG. 14, the latching edges 166 of the movable plates 96 engage the actuator arm 164, thus causing the cessation of rotation of the movable plates 96 with the common drive shaft 84 and the fixed and spaced plates 92. Rotation of the common drive shaft 84 and the fixed and spaced plates 92 continues relative to the movable plates 96 until the actuator arm camming surface 172 of the fixed and spaced plates 92 engages the actuator arm 164 of the selector relay 160, as shown in FIGS. 15 and 16, and moves the actuator arm 164 out of the path of the latching edge 166. Thereafter, there would be a tendency for the movable plates 96 to rotate counterclockwise due to the action of the biasing spring 108. However, as has been previously explained, the spring biased latching element 168 engages the latching surface 170 and notch surface 174 and prevents this rotation. During this movement of the fixed and spaced plates 92 relative to the movable plates 96, the drive pin 88 moves outwardly in its radial slot 102 so as to engage the arcuate drive surface 134 of the sector-shaped locking member 128 to therefore drive the sector-shaped locking member 128 outwardly away from the drive pin 88 to move the pin element 176 out of the rearwardly-positoned star-slot 126 to enable the star-shaped gear member 114 to be subsequently rotated. Next the drive pin 88 moves into one of the star-slots 126 and continues this movement within the star slot 126, thus driving the star-shaped gear member 114 a predetermined distance, which is the distance corresponding to one dispensing position. After the drive pin 88 has moved in the star-slot 126 a predetermined distance, it emerges therefrom and moves away from the sector-shaped locking member 128, thereby enabling the sector-shaped locking member 128 to move with the drive pin 88 so as to enable the pin element 176 formed thereon to enter the rear star-slot 126 of the star-shaped gear member 114 to prevent any movement of the star-shaped gear member 114 due to the weight of the articles of merchandise stored in the endless chain-type shelf mechanism 58.

When the star-shaped gear member 114 rotates one dispensing position the first drive gear 122 rigidly connected thereto rotates with the star-shaped gear member 114 and consequently rotates the second drive gear 140 continually in mesh with the first drive gear 122 and consequently the third drive gear 150 which is continuously in mesh with the second drive gear 150. The sprocket assembly 146, including the drive sprockets 82 therefore rotates one dispensing position. The drive sprockets 82 in their notches 158 engage the shelf-connecting shafts 78 and thereby move the chain of L-shaped shelves 60 in their U-shaped guide rails 68 and in their L-shaped guide rails 70, thus moving the endless chain of L-shaped shelves 60 one dispensing position.

Referring now to FIGS. 9 and 31, it can be seen that if the endless chain of L-shaped shelves 60 is moved one dispensing position, the articles of merchandise contained in the L-shaped shelves 60 will move from the display position 60′ out from under the merchandise to position 60″ and in movement from position 60′ to position 60″ the article of merchandise will be dropped onto the inner delivery tray 51 and down the inclined inner delivery tray 51 to the outer delivery tray 52 under the delivery door 54. The purchaser then lifts the delivery door 54 and removes the articles of merchandise.

After the star-shape gear member 114 has been moved one dispensing position and consequently the L-shaped shelves 60 have been moved one dispensing position, the drive-pin moving mechanism 90 is still moving inasmuch as its cycle is not completed. The common drive shaft 84 is still rotating, thereby rotating both the fixed and spaced plates 92 and the movable plates 96. The unlatching pin 178 illustrated in FIG. 12 and in phantom in FIGS. 13 through 20 is positioned on the frame member 118 and is arranged to be in the path of the spring-bias latching element 168 and when the spring-bias latching element 168 engages the latching pin element 178, the spring-bias latching element 168 is moved away from the latching surface 170 and the notch surface 174, thus enabling the biasing spring 108 to rotate the movable plates 96 in a clockwise position so as to be returned to their initial position, as viewed in FIG. 13. The drive motor 86 is provided with a single cycle control switch (not shown) that stops motor 86 after one cycle and such can be readily provided by one skilled in the art.

Assume now that the purchaser desires to acquire an article of merchandise from the mint-gum unit 42. A mint-gum selector mechanism 48 functionally identical to the described candy-pastry selector mechanism 46 with the exception of the provision of the delivery door senser 328 as was previously stated, is associated with the mint-gum unit 42 and is positioned on the upper right-hand side of the vending machine 10, as can be seen in the drawings. A representation of the article of merchandise associated with each of the selector push buttons 302 of the mint-gum selector mechanism 48 must be provided so that the purchaser can determine his or her selection.

The mint-gum selector mechanism 48 functions as does the candy-pastry selector mechanism 46 and in response to the activation of a selector push button 302 of the mint-gum selector mechanism 48 the drive motor 206 of the mint-gum unit 42 is energized. The drive motor 206 drives the cams 208 positioned on each side of the mint-gum unit 42 through one complete cycle, by means of a drive link mechanism 210 which can be provided by anyone skilled in the art. The mint-gum activator mechanisms 220 positioned in the upper and lower pair of elongated drive slots 226 are in their initial starting position positioned behind the four upper merchandise storage sections 200 and the four lower merchandise storage sections 202 and which is to the left as viewed in FIG. 21. The mint and gum activator mechanism 220 must be also initially positioned in front of the selector magnets 258 and their associated armature 260, and this is to the right of the armature 260 of the selector magnet 258 as viewed in FIG. 21. When a purchaser activates a particular selector magnet 258 corresponding to the article of merchandise desired, the associated armature 260 pivots upwardly, as viewed in FIGS. 21 and 25, and as best shown in dotted lines in FIG. 25. After a particular selector magnet 258 has been energized, and the armature 260 associated therewith pulled in, the movement of the mint-gum activator mechanisms 220 commences through the drive of the drive motor 206. As can be readily seen in the drawings and as can be understood, the rotation of the cams 208 causes the drive arm 212 to exert a force to cause the drive arms 214, 216 to cause the mint-gum activator mechanisms 220 to reciprocate in their respective pair of elongated drive slots 226. Inasmuch as the mint-gum activator mechanisms 220 cannot move otherwise in their respective pair of elongated drive slots 226, the only possible regular movement of the mint-gum activator mechanism 220 is a reciprocal movement. The vector of force exerted through the cams 208 and the drive arms 212 on the drive arms 214 and 216, respectively changes in direction but the only component of the vector of force that can have any effect is the component vector force tending to drive the mint-gum activator mechanisms 220 in their respective pair of elongated drive slots 226.

As the mint-gum selector mechanisms 220 move rearwardly or to the left, as viewed in FIGS. 21 and 25 the actuator arm 256 of the movable arm member 244 associated with the energized selector magnet 258 engages the pivotable armature 260 of the energized selector magnet 258 as best illustrated in FIG. 25 in dotted lines and the continued rearward movement or movement to the left as viewed in FIGS. 21 and 25 causes the movable arm member 234 or 236 of the selector unit 232 to pivot around its associated pin and to move in an upward direction. As soon as the movable arm member 234 or 236 begins to move, it moves against its own over-center spring 254. The over-center spring 254 likewise moves with the movable arm member 234 or 236 until a center position is reached wherein the over-center spring 254 is neither exerting a force in one or the other direction on the movable arm member 234 or 236 and as soon as the movable arm member 234 or 236 has passed the center position, then the over-center spring 254 assists in snapping the movable arm member 234 or 236 in its upward direction, as viewed in FIGS. 23 and 25.

The mint-gum activator mechanisms 220 just move far enough to the rear or to the left, as viewed in FIG. 21 to cause the upward pivoting of the movable arm member 234 or 236 associated with the energized selector magnet 258 corresponding to the article of merchandise selected by the purchaser. Thereafter, the movement of the mint-gum activator mechanisms 220 reverses, and the mint-gum selector mechanisms 220 move frontwardly or to the right, as viewed in FIG. 21 in their pair of elongated drive slots 226. As the mint-gum activator mechanisms 220 move into the four upper merchandise storage sections 200 and the four lower merchandise storage sections 202, the activated movable arm member 234 or 236 that is the movable arm member 234 or 236 that is in an upward position, extends into its associated bottom support slot 272 positioned in the bottom support section 270. The mint-gum articles of manufacture or articles of merchandise equivalent thereto in size are positioned on the bottom support sections 270 and stacked as previously described. Therefore, when the mint and gum activator mechanisms 220 move into the upper and lower merchandise storage sections 200 and 202, one of the movable arm members 234 or 236 will be in an upward position and will engage the rear portion of the stored article of merchandise and as the mint and gum activator mechanisms 220 continue their frontward movement or movement to the right as viewed in FIGS. 21 and 25, the article of merchandise engaged by the movable arm member 234 or 236 will be pushed forward and out of the mint and gum unit 42. As the article of merchandise moves forward, it opens a front dispensing door 264 which in turn activates the micro-switch 266. Micro-switch 266 thereafter causes a signal to be sent to the escrow circuit (not shown) indicating that merchandise has been delivered and that storage of the coins held in escrow can occur. As the mint and gum activator mechanism 220 continues its forward movement, it shoves an article of merchandise out through the door 264 and between the guide wires 274 to drop onto collector tray 201 and from there to the outer delivery tray 52. Just after the mint and gum activator mechanism 220 has pushed the selected article of merchandise out of the mint-gum unit 42, the actuator arm 256 of the activated selector unit 232 engages the de-activator bracket 262, shown in FIG. 25, and this moves the movable arm member 234 or 236 back to its neutral position. As before, the over-center spring 254 initially works against the action of the de-activator bracket 262 and then after the center position is reached, it aids in snapping the movable arm member 234 or 236 to its de-activated position, which is the position shown in solid lines in FIG. 25.

During the time that the activated movable arm member 234 or 236 was in its upward position and therefore extending up through the bottom support slots 272, the remainder of the movable arm members 234 or 236 were in their de-activated position and their movable arm member 234 or 236 did not extend up in through the bottom support slots 272 and therefore did not move any of the other articles of merchandise.

What has been described is considered to be the preferred embodiment of the invention, however many modifications and alterations can be made without departing from the scope of the appended claims which are intended to be limited only by the prior art.

What is claimed is:

1. A rotatable storage unit comprising:
a rail support member forming a pair of spaced rails extending in a closed loop pattern;
a plurality of individual shelf units each comprising a vertical surface and a horizontal surface and each of said vertical surfaces hingedly connected one to the other in an endless chain arrangement and each being provided with a pair of spaced rail engaging elements and each of said rail engaging elements positioned in said pair of spaced rails in said rail support member;
a drive mechanism positioned between said pair of spaced rails in said rail support member and comprising, a first driving means and
a first driven means selectively engageable with one another for coupling motion from said first driving means to said first driven means,
said first driven means engageable with at least one of said plurality of shelf units along at least one hinge connection for driving said plurality of shelf units in said pair of spaced rails in said rail support member, and
actuating means for causing said first driving means to couple with and engage its associated driven means whereby said endless chain arrangement of shelves is driven in said spaced rails of said rail support member.

2. A rotatable storage unit comprising:
a rigid support member forming spaced closed-loop-defining guides therein;
a plurality of individual shelf units connected one to the other in an endless chain-type arrangement and positioned so as to be guided by said guides;
a drive mechanism positioned between said pair of spaced guides in said rail support member and comprising,
a first driving means and
a first driven means selectively engageable with one another for coupling motion from said first driving means to said first driven means,
said first driven means engageable with at least one of said plurality of shelf units along at least one hinge connection for driving said plurality of shelf units in said pair of spaced guides in said support member, and
actuating means for causing said first driving means to couple with and engage its associated driven means whereby said endless chain arrangement of shelves is driven in said spaced guides of said support member.

3. A rotatable storage unit comprising:
a rigid support member forming spaced closed-loop-defining guides therein;
a plurality of individual shelf units connected one to the other in an endless chain-type arrangement and positioned in said guides for movement therein;
a drive mechanism positioned between said pair of spaced guides in said rail support member and comprising,
a first driving means and
a first driven means selectively engageable with one another for coupling motion from said first driving means to said first driven means,
said first driven means engageable with at least one of said plurality of shelf units along at least one hinge connection for driving said plurality of shelf units in said pair of spaced guides in said rail support member, and
actuating means for causing said first driving means to couple with and engage its associated driven means whereby said endless chain arrangement of shelves is driven in said spaced guides of said support member.

4. A rotatable storage unit comprising:
a rail support member forming spaced rails extending in a closed loop pattern;
a plurality of individual shelf units each comprising a first surface and a second surface forming an angle with said first surface and each of said second surfaces connected one to the other in an endless chain arrangement and each provided with spaced rail engaging elements and each of said rail engaging elements positioned in said spaced rails in said rail support member;
a drive mechanism positioned in said rotatable storage unit and comprising,
a first driving means and
a first driven means selectively engageable with said first driving means for coupling motion from said first driving means to said first driven means;

said first driven means engageable with at least one of said plurality of shelf units for driving said plurality of shelf units in said spaced rails in said rail support member; and actuating means for causing said first driving means to couple with and engage its associated driven means whereby said endless chain arrangement of shelves is driven in said spaced rails of said rail support member.

5. A rotatable storage unit comprising:

a rail support member forming a pair of spaced rails extending in a closed loop pattern;

a plurality of individual shelf units each comprising a vertical surface and a horizontal surface and each of said vertical surfaces hingedly connected one to the other in an endless chain arrangement and each hinge provided with a pair of spaced rail engaging elements and each of said rail engaging elements positioned in said pair of spaced rails in said rail support member;

a drive mechanism positioned between said pair of spaced rails in said rail support member and comprising, a first driving means;

a first driven means;

said first driving means provided with at least one positioning element capable of relative movement with said first driving means and capable of being held in at least two positions relative to said first driving means;

first latch means for causing said positioning element to move from a first position relative to said first driving means to a second position relative to said first driving means;

a second latch means for retaining said positioning element in said second position;

a movable clutch member slidably affixed to said first driving means and movable from a first clutch position to a second clutch position responsive to the movement of said first positioning means from said first position to said second position relative to said first driving means;

said first driven means engageable with at least one of said plurality of shelf units along at least one hinge connection for driving said plurality of shelf units in said pair of spaced rails in said rail support member, and actuating means for causing said first driving means to couple with and engage its associated driven means whereby said endless chain arrangement of shelves is driven in said spaced rails of said rail support member;

engaging means formed in said first driven means to engage said clutch member when said clutch member is in said second clutch position and movable with said clutch member; and a first unlatching means positioned exterior to said first driving means for releasing said second latch means after said second latch means has retained said positioning member in said second position relative to said first driving means.

6. A rotatable storage unit comprising:

a rail support member forming spaced rails extending in a closed loop pattern;

a plurality of individual shelf units each comprising a first surface and a second surface forming an angle with said first surface and each of said second surfaces connected one to the other in an endless chain arrangement and each provided with spaced rail engaging elements and each of said rail engaging elements positioned in said spaced rails in said rail support member;

a drive mechanism positioned in said rotatable storage unit and comprising:

a first driving means, a first driven means, said first driving means provided with at least one positioning element capable of relative rotational movement with said first driving means and capable of being held in at least two positions relative to said first driving means, first latch means for causing said positioning element to move from a first position relative to said first driving means to a second position relative to said first driving means, a second latch means for retaining said positioning element in said second position, a movable clutch member slidably affixed to said first driving means and movable from a first clutch position to a second clutch position responsive to the movement of said first positioning element from said first position to said second position relative to said first driving means, said first driven means engageable with at least one of said plurality of shelf units for driving said plurality of shelf units in said spaced rails in said rail support member, engaging means formed in said first driven means to engage said clutch member when said clutch member is in said second clutch position and movable with said clutch member whereby said first driven means is selectively driven by said first driving means, and a first unlatching means positioned exterior to said first driving means for releasing said second latch means after said second latch means has retained said positioning element in said second position relative to said first driving means.

7. A rotatable storage unit comprising:

a rail support member forming a pair of spaced rails extending in a closed loop pattern;

a plurality of individual shelf units each comprising a vertical surface and a horizontal surface and each of said vertical surfaces hingedly connected one to the other in an endless chain arrangement and each hinge provided with a pair of spaced rail engaging elements and each of said rail engaging elements positioned in said pair of spaced rails in said rail support member;

a drive mechanism positioned between said pair of spaced rails in said rail support member and comprising, a first driving means, a first driven means, said first driving means provided with at least one positioning element capable of relative movement with said first driving means and capable of being held in at least two positions relative to said first driving means, first latch means for causing said positioning element to move from a first position relative to said first driving means to a second position relative to said first driving means, a second latch means for retaining said positioning element in said second position, a movable clutch member slidably affixed to said first driving means and movable from a first clutch position to a second clutch position responsive to the movement of said first positioning element from said first position to said second position relative to said first driving means, said first driven means engageable with at least one of said plurality of shelf units along at least one hinge connection for driving said plurality of shelf units in said pair of spaced rails in said rail support member, engaging means formed in said first driven means to engage said clutch member when said clutch member is in said second clutch position and movable with said clutch member; and a first unlatching means positioned exterior to said first driving means for releasing said second latch means after said second latch means has retained said positioning element in said second position relative to said first driving means.

8. A rotatable storage unit comprising:

a rail support member forming spaced rails extending in a closed loop pattern;

a plurality of individual shelf units connected one to the other in an endless chain arrangement and each shelf unit provided with a pair of spaced rail engaging elements and each of said rail engaging elements positioned in said spaced rails in said rail support member;

a drive mechanism positioned in said rotatable storage unit and comprising, a first rotatable driving means, a second rotatable driven means, said first driving means provided with at least one positioning element capable of relative rotational movement with said first driving means and capable of being held in at least two positions relative to said first driving means, first latch means for causing said positioning element to move from a first position relative to said first driving means to a second position relative to said first driving means, a second latch means for retaining said positioning element in said second position, a movable clutch pin member slidably affixed to said first driving means for radial movement therewith and movable from a first clutch pin position to a second clutch pin position responsive to the movement of said first positioning element from said position to said second position relative to said first driving means, said first driven means engageable with at least one of said plurality of shelf units for driving said plurality of shelf units in said spaced rails in said rail support member, engaging means formed in said first driven means to engage said clutch pin member when said clutch pin member is in said second clutch pin position and movable with said clutch pin member whereby said first driven means is selectively driven by said first driving means, and a first unlatching means positioned exterior to said first driving means for releasing said second latch means after said second latch means has retained said positioning element in said second position relative to said first driving means.

9. A rotatable storage unit comprising:

a rail support member forming a pair of spaced rails extending in a closed loop pattern;

a plurality of individual shelf units each comprising a vertical surface and a horizontal surface and each of said vertical surfaces hingedly connected one to the other in an endless chain arrangement and each hinge provided with a pair of spaced rail engaging elements and each of said rail engaging elements positioned in said pair of spaced rails in said rail support member;

a drive mechanism positioned between said pair of spaced rails in said rail support member and comprising:

a first rotatable driving means, a first rotatable driven means, and first driving means provided with at least one positioning element capable of relative movement with said first driving means and capable of being held in at least two positions relative to said first driving means, first latch means for causing said positioning element to move from a first position relative to said first driving means to a second position relative to said first driving means, a second latch means for retaining said positioning element in said second position, a movable clutch pin member slidably affixed to said first driving means for radial movement therewith and movable from a first clutch pin position to a second clutch pin position responsive to the movement of said positioning element from said first position to said second position relative to said first driving means, said first driven means engageable with at least one of said plurality of shelf units for driving said plurality of shelf units in said pair of spaced rails in said rail support member, engaging means formed in said first driven means to engage said clutch pin member when said clutch pin member is in said second clutch pin position and movable with said clutch pin member, and a first unlatching means positioned exterior to said first driving means for releasing said second latch means after said second latch means has retained said positioning element in said second position relative to said first driving means.

10. A rotatable storage unit comprising:

a rail support member forming a pair of spaced rails extending in a closed loop pattern;

a plurality of individual shelf units each comprising a vertical surface and a horizontal surface and each of said vertical surfaces hingedly connected one to the other in an endless chain arrangement and each hinge provided with a pair of spaced rail engaging elements and each of said rail engaging elements positioned in said pair of spaced rails in said rail support member;

a drive mechanism positioned between said pair of spaced rails in said rail support member and comprising, a first rotatable driving means, a first rotatable driven means, said first driving means provided with at least one spring biased positioning element capable of relative rotational movement with said first driving means and capable of being held in at least two positions relative to said first driving means, first latch means positioned exterior to said first driving means for causing said positioning element to move from a first position relative to said first driving means to a second position relative to said first driving means, a movable clutch pin member slidably affixed to said first driving means for radial movement therewith and movable from a first clutch pin position to a second clutch pin position responsive to the movement of said positioning element from said first position to said second position relative to said first driving means, said first driven means engageable with at least one of said plurality of shelf units for driving said plurality of shelf units in said pair of spaced rails in said rail support member, engaging means formed in said first driven means to engage said clutch pin member when said clutch pin member is in said second clutch pin position and movable with said clutch pin member whereby said first driven means is selectively driven by said first driving means, and a first unlatching means positioned exterior to said first driving means for releasing said second latch means after said second latch means has retained said positioning element in said second position relative to said first driving means.

11. A rotatable storage unit comprising:

a rail support member forming a pair of spaced rails extending in a closed loop pattern;

a plurality of individual shelf units each comprising a vertical surface and a horizontal surface and each of said vertical surfaces hingedly connected one to the other in an endless chain arrangement and each hinge provided with a pair of spaced rail engaging elements and each of said rail engaging elements positioned in said pair of spaced rails in said rail support member;

a drive mechanism positioned between said pair of spaced rails in said rail support member and comprising:

a first rotatable driving means, a first rotatable driven means, said first driving means comprising a rotatable driving shaft, at least one fixed plate rigidly secured to said driving shaft, at least one spring biased movable plate rotatably secured to said driving shaft and capable of relative rotational movement with said fixed plate and capable of being held in at least two positions relative to said fixed plate, a first latch means selectively engaging said movable plate to cause the movement of said movable plate from a first position relative to said fixed plate to a second position relative to said fixed plate, a second spring biased latch means positioned on said fixed plate for retaining said movable plate in said second position relative to said fixed plate, a movable clutch pin member slidably affixed to said fixed plate and said movable plate for radial movement with respect to said fixed plate and movable from a first clutch pin position to a second clutch pin position responsive to the movement of said movable plate from said first position to said second position relative to said fixed plate, said first driven means engageable with at least one of said plurality of shelf units for driving said plurality of shelf units in said pair of spaced rails in said rail support member, engaging means formed in said first driven means to engage said clutch pin member when said clutch pin member is in said second clutch pin position and movable with said clutch pin member whereby said first driven means is selectively driven by said first driving means, and a first unlatching means positioned exterior to said first driving means for releasing said second spring biased latch means after said second spring biased latch means has retained said movable plate in said second position relative to said fixed plate.

12. A storage and vending unit comprising:

a plurality of individually rotatable endless chain type shelf units secured to one another and forming a rigid unit;

each shelf unit being provided with a selective drive mechanism comprising a first driving means and a first driven means selectively engageable with one another for coupling motion from said first driving means to said first driven means;

each of the first driven means engageable with its associated rotatable endless chain type shelf unit for driving its associated rotatable endless chain type shelf unit;

common drive means for simultaneously driving each first driving means of each shelf unit; and selectively operated actuating means for causing one of said first driving means to couple with and engage its associated driven means whereby one of said endless chain type shelf units is individually driven.

13. A storage and vending unit comprising:

a plurality of individually rotatable endless chain type self units secured to one another and forming a rigid unit;

each shelf unit being provided with a selective drive mechanism comprising a first driving means and a first driven means selectively engageable with one another for coupling motion from said first driving means to said first driven means;

common drive means for simultaneously driving each first driving means of each shelf unit;

each of said first driving means comprising relatively rotatable means for moving a clutch element from a first clutch element position to a second clutch element position;

each of said first driven means comprising an engageable member positioned so as to engage said clutch element when said clutch element is in said second clutch element position and positioned not to engage said clutch element when said clutch element is in said first clutch element position and each of said first driven means engageable with its associated rotatable endless chain type shelf unit for driving its associated rotatable endless belt type shelf unit; and selectively operated actuating means selectively engaging one of said relatively rotatable means of one of said first driving means for causing one of said first driving means to couple with and engage its associated driven means whereby one of said endless chain type shelf units is individually driven.

14. A storage and vending unit comprising:

a plurality of individually rotatable endless chain type shelf units secured to one another to form a rigid unit;

each shelf unit being provided with a selective drive mechanism comprising a first driving means and a first driven means selectively engageable with one another for coupling motion from said first driving means to said first driven means;

common drive means for driving each first simultaneously driving means of each shelf unit;

each of said first driving means comprising relatively rotatable means for moving a clutch pin from a first clutch pin position to a second clutch pin position;

said first driven means comprising an engageable gear member positioned so as to engage said clutch pin when said clutch pin is in said second clutch pin position and positioned not to engage said clutch pin when said clutch pin is in said first clutch pin position;

selectively operated actuating means for causing one of said first driving means to couple with and engage its associated first driven means whereby one of said endless chain type shelf units is individually actuated.

15. A storage and vending unit comprising:

a plurality of individually rotatable endless chain type shelf units secured to one another and forming a rigid unit;

each shelf unit being provided with a selective drive mechanism comprising a first driving means and a first driven means selectively engageable with one another for coupling motion from said first driving means to said first driven means;

common drive means for simultaneously driving each first driving means of each shelf unit;

each of said first driving means comprising relatively rotatable means for moving a clutch element from a first clutch element position to a second clutch element position;

each of said first driven means comprising an engageable member positioned so as to engage said clutch element when said clutch element is in said second clutch element position and positioned not to engage said clutch element when said clutch element is in said first clutch element position and each of said first driven means engageable with its associated rotatable endless chain type shelf unit for driving its associated rotatable endless chain type shelf unit;

selectively operated actuating means selectively engaging one of said relatively rotatable means of one of said first driving means for causing one of said first driving means to couple with and engage its associated first driven means whereby one of said endless chain type shelf units is individually actuated; and means predeterminedly positioned in each of said driving means for causing said relatively rotatable means to move said clutch pin from its second clutch pin position to its first clutch pin position whenever any of said first driving means is coupled to its associated first driven means.

16. A storage and vending unit comprising:

a plurality of individually rotatable endless chain type shelf units secured to one another and forming a rigid unit;

each of said endless chain type shelf units comprising, a support member forming spaced guides extending in a closed loop pattern, and a plurality of individual shelves connected one to the other in an endless chain arrangement and each shelf provided with spaced guide engaging elements and each of said guide engaging elements positioned in said guides in said support member;

each shelf unit being provided with a selective drive mechanism comprising a first driving means and a first driven means selectively engageable with one another for coupling motion from said first driving means to said first driven means;

each of said first driven means engageable with its associated endless belt type shelf mechanism for driving its associated endless belt type shelf mechanism;

common drive means for simultaneously driving each first driving means of each shelf unit; and selectively operated actuating means for causing one of said first driving means to couple with and engage its associated first driven means whereby one of said endless chain type shelf units is individually driven in the guides in its associated support member.

17. A storage and vending unit comprising:

a plurality of individually rotatable endless chain type shelf units secured to one another and forming a rigid unit;

each of said endless chain type shelf units comprising, a rail support member forming spaced rails extending in a closed loop pattern, and a plurality of individual shelves connected one to the other in an endless chain arrangement and each shelf provided with spaced rail engaging elements and each of said rail engaging elements positioned in said spaced rails in said rail support member;

each shelf unit having a selectively operated drive mechanism positioned between said spaced rails in said rail support member and comprising, a first driving means and a first driven means selectively engageable with one another for coupling motion from said first driving means to said first driven means, said first driven means engageable with at least one of said plurality of shelves for driving said plurality of shelves in said spaced rails in said rail support member, common drive means for simultaneously driving each first driving means of each shelf unit; and selectively operated actuating means selectively engaging one of said shelf units for causing one of said first driving means to couple with and engage its associated first driven means whereby one of said shelf units is individually driven.

18. A storage and vending unit comprising:

a plurality of individually rotatable endless chain type shelf units secured to one another and forming a rigid unit;

each of said endless chain type shelf units comprising, a rail support member forming a pair of spaced rails extending in a closed loop pattern, and a plurality of individual shelves each comprising a vertical surface and a horizontal surface and each of said vertical surfaces hingedly connected one to the other in an endless chain arrangement and each hinge provided with a pair of spaced rail engaging elements and each of said rail engaging elements positioned in said pair of spaced rails in said rail support member;

a selectively operated drive mechanism positioned between said pair of spaced rails in said rail support member and comprising, a first driving means and a first driven means selectively engageable with one another for coupling motion from said first driving means to said first driven means, said first driven means engageable with at least one of said plurality of shelves along at least one hinge connection for driving said plurality of shelves in said pair of spaced rails in said rail support member;

common drive means for driving each first simultaneously driving means of each shelf unit;

each of said first driving means comprising relatively rotatable means for moving a clutch pin from a first clutch pin position to a second clutch pin position;

said first driven means comprising an engageable gear member positioned so as to engage said clutch pin when said clutch pin is in said second clutch pin position and positioned not to engage said clutch pin when said clutch pin is in said first clutch pin position; and selectively operated actuating means selectively engaging said relatively rotatable means for causing one of said first driving means to couple with and engage its associated first driven means whereby one of said endless chain type shelf units is individually driven.

19. A storage and vending unit comprising:

a plurality of individually rotatable endless chain type shelf units secured to one another and forming a rigid unit;

each of said endless chain type shelf units comprising, a rail support member forming a pair of spaced rails extending in a closed loop pattern, and a plurality of individual shelves each comprising a vertical surface and a horizontal surface and each of said vertical surfaces hingedly connected one to the other in an endless chain arrangement and each hinge provided with a pair of spaced rail engaging elements and each of said rail engaging elements positioned in said pair of spaced rails in said rail support member, a selectively operated drive mechanism positioned between said pair of spaced rails in said rail support member and comprising, a first driving means and a first driven means selectively engageable with one another for coupling motion from said first driving means to said first driven means, said first driven means engageable with at least one of said plurality of shelves along at least one hinge connection for driving said plurality of shelves in said pair of spaced rails in said rail support member, said first driving means provided with at least one positioning element capable of relative rotational movement with said first driving means and capable of being held in at least two positions relative to said first driving means, selectively operated first latch means for causing said positioning element to move from a first position relative to said first driving means to a second position relative to said first driving means;

a second latch means for retaining said positioning element in said second position, a movable clutch member slidably affixed to said first driving means and movable from a first clutch position to a second clutch position responsive to the movement of said first positioning means from said first position to said second position relative to said first driving means, engaging means formed in said first driven means to engage said clutch member when said clutch member is in said second clutch position and movable with said clutch member, common drive means for driving each first driving means of each shelf unit;

selectively operated actuating means selectively operating one of said first latch means for causing one of said first driving means to couple with and engage its associated first driven means whereby one of said endless chain type shelf units is individually driven, a first unlatching means positioned exterior to said first driving means for releasing said second latch means after said second latch means has retained said positioning member in said second position relative to said first driving means.

References Cited by the Examiner

UNITED STATES PATENTS

| | | | |
|---|---|---|---|
| 1,380,029 | 5/21 | White | 221—78 |
| 1,389,267 | 8/21 | Norton et al. | 192—20 |
| 1,643,224 | 9/27 | Shelton | 211—121 |
| 1,985,825 | 12/34 | Harrison | 192—20 |
| 2,030,741 | 2/36 | Bodine | 211—121 |
| 2,241,489 | 5/41 | Steiner | 221—125 |
| 2,285,435 | 6/42 | Holcomb | 221—79 |
| 2,540,750 | 2/51 | Morrison | 248—2 |
| 2,665,184 | 1/54 | Hord | 221—84 |
| 2,695,147 | 11/54 | Castricone | 248—2 |
| 2,799,173 | 7/57 | Baird | 221—76 X |
| 2,923,392 | 2/60 | Gabrielsen | 221—129 X |
| 3,001,671 | 9/61 | Pryor | 221—125 |
| 3,021,030 | 2/62 | Thompson | 221—77 |
| 3,057,512 | 10/62 | Shurtz | 221—77 |

FOREIGN PATENTS

| | | |
|---|---|---|
| 884,592 | 12/61 | Great Britain. |

RAPHAEL M. LUPO, *Primary Examiner.*

LOUIS J. DEMBO, HADD S. LANE, *Examiners.*